United States Patent
Matsushita et al.

(10) Patent No.: US 8,662,663 B2
(45) Date of Patent: Mar. 4, 2014

(54) HYBRID SOFT CONTACT LENS, AND PRODUCTION METHOD AND HYDRATION TREATMENT METHOD THEREOF

(75) Inventors: Ryo Matsushita, Kasugai (JP); Koji Otani, Kasugai (JP); Kazuharu Niwa, Kasugai (JP); Kazuhiko Nakada, Nagoya (JP)

(73) Assignee: Menicon Co., Ltd., Nagoya-Shi (JP)

( * ) Notice: Subject to any disclaimer, the term of this patent is extended or adjusted under 35 U.S.C. 154(b) by 2 days.

(21) Appl. No.: 13/382,637

(22) PCT Filed: Jul. 5, 2010

(86) PCT No.: PCT/JP2010/061431
§ 371 (c)(1),
(2), (4) Date: Mar. 22, 2012

(87) PCT Pub. No.: WO2011/004800
PCT Pub. Date: Jan. 13, 2011

(65) Prior Publication Data
US 2012/0169994 A1    Jul. 5, 2012

(30) Foreign Application Priority Data

Jul. 8, 2009  (JP) .................... 2009-161629

(51) Int. Cl.
*G02C 7/04* (2006.01)
(52) U.S. Cl.
USPC ........... 351/159.33; 351/159.02; 156/196; 156/83
(58) Field of Classification Search
USPC ........... 351/159.05–159.08, 159.33, 159.34, 351/159.67, 159.68; 8/507; 156/83
See application file for complete search history.

(56) References Cited

U.S. PATENT DOCUMENTS

| | | | |
|---|---|---|---|
| 4,407,766 A * | 10/1983 | Haardt et al. | 264/2.2 |
| 4,943,150 A * | 7/1990 | Deichert et al. | 351/159.74 |
| 4,954,586 A * | 9/1990 | Toyoshima et al. | 526/245 |
| 5,498,681 A * | 3/1996 | Askari et al. | 526/246 |
| 2004/0073303 A1* | 4/2004 | Schanzlin et al. | 623/5.16 |
| 2005/0157256 A1* | 7/2005 | Gotou et al. | 351/160 R |
| 2006/0001184 A1* | 1/2006 | Phelan et al. | 264/1.32 |
| 2007/0149699 A1* | 6/2007 | Matsumoto et al. | 524/556 |
| 2007/0232755 A1* | 10/2007 | Matsushita et al. | 525/209 |

FOREIGN PATENT DOCUMENTS

| | | |
|---|---|---|
| GB | 1 417 650 | 12/1975 |
| JP | 49-120655 | 11/1974 |
| JP | 06-121826 | 5/1994 |
| JP | 3309856 B2 | 6/1996 |

(Continued)

OTHER PUBLICATIONS

International Search Report for corresponding International Application No. PCT/JP2010/061431, Oct. 5, 2010.

*Primary Examiner* — Evelyn A. Lester
*Assistant Examiner* — William Alexander
(74) *Attorney, Agent, or Firm* — Ditthavong Mori & Steiner, P.C.

(57) ABSTRACT

The present invention provides a hybrid soft contact lens including a central portion formed with a first hydrous soft material, and a peripheral portion formed with a second hydrous soft material, in which the first hydrous soft material is obtained by curing a first curable composition including a silicone-containing monomer. Preferably, the first hydrous soft material has a Young's modulus of no less than 3.0 MPa and no greater than 100 MPa, and the second hydrous soft material has a Young's modulus of no less than 0.20 MPa and less than 3.0 MPa.

15 Claims, 2 Drawing Sheets

(56) References Cited

FOREIGN PATENT DOCUMENTS

| | | |
|---|---|---|
| JP | 08-507094 | 7/1996 |
| JP | 2005-031307 | 2/2005 |
| JP | 2005-181729 | 7/2005 |
| JP | 2006-515689 | 6/2006 |
| JP | 2007-524870 | 8/2007 |
| JP | 2009-098457 | 5/2009 |
| WO | WO 2005/116728 | 12/2005 |
| WO | WO 2007/066666 | 6/2007 |

* cited by examiner

HYBRID SOFT CONTACT LENS, AND PRODUCTION METHOD AND HYDRATION TREATMENT METHOD THEREOF

TECHNICAL FIELD

The present invention relates to a hybrid soft contact lens that gives favorable wearing feel and enables continuous wearing, a method for producing such a hybrid soft contact lens, and a hydration treatment method of such a hybrid soft contact lens.

BACKGROUND ART

Some hybrid contact lenses that include a soft material and a hard material have been proposed as lenses that give excellent wearing feel, and has superior oxygen permeability (see Patent Document 1, Patent Document 2 and Patent Document 3). However, according to these lenses, due to a plurality of materials constituting the lens having greatly varying Young's modulus, the difference that results from shape deformation under the same stress condition is significant. Thus, uncomfortable feeling occurs upon blinking, thereby deteriorating the wearing feel.

In addition, since a hard lens containing a silicone component and having a low water absorption rate is significantly inferior in wettability, the wearing feel is extremely deteriorated due to dry feel. Particularly, in the case of conventional hybrid contact lenses, a hard segment having low wettability with water is situated at the farthermost position from the periphery where the lacrimal fluid is supplied although the lens has the same size as those of soft contact lenses. Therefore, sufficient lacrimal film is not provided, and thus the wearing feel is extremely deteriorated by way of drying. In the case in which a hard portion is included in a soft portion as disclosed in Patent Document 4, the wearing feel is similarly deteriorated due to the difference between the original hardness of the hard portion and the hardness at the peripheral portion. It is necessary to subject these hybrid contact lenses to a sterilization treatment; however, when a hard material is used at the central portion, a sterilization treatment carried out by high-pressure steam causes plastic deformation at the hard portion, leading to impairment of the functions of the lens. Although these lenses can be subjected to sterilization with radioactive rays, this process is not practical due to problems in terms of costs and the like. Furthermore, the method disclosed in Patent Document 5 cannot sufficiently secure the amount of oxygen to be supplied to the cornea, due to the absence of a silicone component that is responsible for high oxygen permeability.

In addition, a silicone-containing hydrous soft lens has been also proposed as a hydrous lens including silicone that gives comfortable wearing feel and is superior in oxygen permeability, and which enables continuous wearing, whereas being more superior in retention of the lacrimal fluid than conventional silicone-containing hard lenses and being constituted with a soft identical polymer (Patent Document 6). However, when a hydrous soft contact lens that is superior in optical properties and that enables continuous wearing is produced using this procedure, the Young's modulus of the entirety of the lens increases; therefore the Young's modulus at the peripheral portion which primarily serves in improving the wearing feel is increased, thereby rather leading to deterioration of wearing feel.

PRIOR ART DOCUMENTS

Patent Documents

Patent Document 1: Japanese Unexamined Patent Application, Publication No. S49-120655
Patent Document 2: Japanese Patent No. 3309856
Patent Document 3: pamphlet of PCT International Publication No. WO2005/116728
Patent Document 4: Japanese Unexamined Patent Application (Translation of PCT Application), Publication No. 2006-515689
Patent Document 5: Japanese Unexamined Patent Application (Translation of PCT Application), Publication No. H8-507094
Patent Document 6: Japanese Unexamined Patent Application, Publication No. H6-121826

SUMMARY OF THE INVENTION

Problems to be Solved by the Invention

The present invention provides a hydrous hybrid soft contact lens that gives favorable wearing feel and enables continuous wearing, and which can be steam sterilized under pressure. Also provided are a method for producing such a hybrid soft contact lens and a hydration treatment method of such a hybrid soft contact lens.

Means for Solving the Problems

An aspect of the present invention which was made in order to solve the foregoing problems provides a hybrid soft contact lens having a central portion formed with a first hydrous soft material, and a peripheral portion formed with a second hydrous soft material, in which the first hydrous soft material is obtained by curing a first curable composition including a silicone-containing monomer.

According to the hybrid soft contact lens, both the central portion and the peripheral portion are formed with a hydrous soft material; therefore, deterioration of wearing feel resulting from the boundary portion to be in contact with the eye can be inhibited. In addition, since the hybrid soft contact lens does not use a hard material, steam sterilization under pressure is enabled.

Moreover, since the first hydrous soft material includes a moiety derived from the silicone-containing monomer in the hybrid soft contact lens, sufficient oxygen permeability can be imparted even to the central portion.

It is preferred that the first hydrous soft material has a Young's modulus of no less than 3.0 MPa and no greater than 100 MPa, and the second hydrous soft material has a Young's modulus of no less than 0.20 MPa and less than 3.0 MPa. According to the hybrid soft contact lens, due to the Young's modulus of the first and second hydrous soft material falling within the above range, deterioration of the wearing feel can be further inhibited since the difference in shape distortion that may occur upon application of force can be small.

In the hybrid soft contact lens, the difference between the rate of size change (A) of the first hydrous soft material and the rate of size change (B) of the second hydrous soft material determined according to the following formula (1) is preferably no greater than 0.05.

Rate of size change=Diameter (mm) of a plate immersed in physiological saline at 20° C. after being subjected to a hydration treatment/Diameter (mm) of the plate prior to the hydration treatment  (1)

According to the hybrid soft contact lens, since the difference between the rates of size change of the first hydrous soft material and the second hydrous soft material falls within the above range, deformation of the lens can be inhibited which results from change in the water content that occurs during a hydration treatment or when dried.

The ratio (B/A) of the rate of size change (B) of the second hydrous soft material with respect to the rate of size change (A) of the first hydrous soft material is preferably no less than 0.94 and no greater than 1.06. When the ratio of the rate of size change falls within the above range, the hybrid soft contact lens can be further prevented from the deformation as described above.

It is preferred that the first curable composition includes a silicone-containing monomer represented by the following formula (I):

[chemical formula 1]

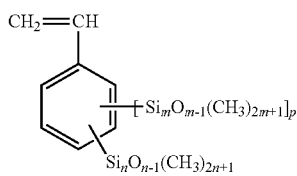

(I)

(in the formula (I), m and n are each independently an integer of 1 to 15, and p is 0 or 1),
and the content of the silicone-containing monomer is no less than 30% by mass and no greater than 70% by mass.

Since the first hydrous soft material includes a moiety derived from a silicone-containing monomer having a specific structure in the hybrid soft contact lens, the central portion of the lens can be provided with oxygen permeability as well as softness with an appropriate Young's modulus.

Another aspect of the present invention provides a method for producing a hybrid soft contact lens including a central portion formed with a first hydrous soft material, and a peripheral portion formed with a second hydrous soft material, the first hydrous soft material being obtained by curing a first curable composition including a silicone-containing monomer, the method including:
forming the first hydrous soft material for the central portion of the lens by curing the first curable composition;
forming a second hydrous soft material for the peripheral portion of the lens by curing the second curable composition; and
shaping a formed product including the first hydrous soft material and the second hydrous soft material into a contact lens shape.

According to the production method, a hybrid contact lens having a central portion and a peripheral portion both formed with a soft material can be efficiently produced.

One of the step of forming the first hydrous soft material, and the step of forming the second hydrous soft material is carried out beforehand, and the other step is carried out while other curable composition is made in contact with the one hydrous soft material thus formed. According to the production method, curing is conducted while a part of the other curable composition is impregnated with one hydrous soft material; therefore, strength of the joining part of the central portion and the peripheral portion of the lens can be enhanced. In addition, since this joining part will have an intermediate softness and rate of size change between those of both hydrous soft materials, deformation of the lens during the hydration treatment and the like can be suppressed.

Additionally, it is preferred that after the step of forming the first hydrous soft material and the step of forming the second hydrous soft material, the production method further includes a step of integrating the formed first hydrous soft material and second hydrous soft material by allowing both hydrous soft materials to adhere via a third curable composition. Also such a production method enables the deformation of the lens during the hydration treatment and the like to be suppressed since the first hydrous soft material and the second hydrous soft material are adhered via a third curable composition.

Moreover, it is also preferred that before the step of forming the first hydrous soft material and the step of forming the second hydrous soft material, the production method includes a step of forming a joining layer having an average thickness of no greater than 0.5 mm by curing a third curable composition, in which
the step of forming the first hydrous soft material is carried out while making the first curable composition in contact with one face of the joining layer, and
the step of forming the second hydrous soft material is carried out while making the second curable composition in contact with another face of the joining layer.

Also such a production method enables the deformation of the lens during the hydration treatment and the like in the production steps to be suppressed since the first hydrous soft material and the second hydrous soft material are integrated via a joining layer.

Furthermore, in these methods for producing a hybrid soft contact lens,
the difference between the rate of size change (A) of the first hydrous soft material and the rate of size change (B) of the second hydrous soft material determined according to the following formula (1) is preferably no greater than 0.05:

Rate of size change=Diameter (mm) of a plate immersed in physiological saline at 20° C. after being subjected to a hydration treatment/Diameter (mm) of the plate prior to the hydration treatment  (1).

Additionally, in these methods for producing a hybrid soft contact lens,
the ratio (B/A) of the rate of size change (B) of the second hydrous soft material with respect to the rate of size change (A) of the first hydrous soft material is preferably no less than 0.94 and no greater than 1.06.

According to the production method, by using the first hydrous soft material and the second hydrous soft material that exhibit approximate rate of size change, deformation of the lens during the hydration treatment after the shaping step, and the like can be further suppressed.

It is preferred that these production methods further include a step of carrying out a hydration treatment of the formed product shaped into a contact lens shape by immersing in a hydration treatment liquid, and in this step,
a combination of the first hydrous soft material, the second hydrous soft material and the hydration treatment liquid may be used capable of giving the difference between the rate of size change (A') of the first hydrous soft material and the rate of size change (B') of the second hydrous soft material determined according to the following formula (1') being no greater than 0.05:

Rate of size change=Diameter (mm) of a plate immersed in the hydration treatment liquid after being subjected to the hydration treatment with the hydration treatment liquid/Diameter (mm) of the plate prior to the hydration treatment     (1').

According to the production method, by selecting the first and second hydrous materials and the hydration treatment liquid taking into consideration the rate of size change of the first and second hydrous soft materials in this manner, and the like deformation of the lens during the hydration treatment can be further reduced.

In the production method, a combination of the first hydrous soft material, the second hydrous soft material and the hydration treatment liquid may be used capable of giving the ratio (B'/A') of the rate of size change (B') of the second hydrous soft material with respect to the rate of size change (A') of the first hydrous soft material being no less than 0.94 and no greater than 1.06. The production method enables the deformation of the lens during the hydration treatment to be further reduced.

Yet another aspect of the present invention provides a hydration treatment method of a hybrid soft contact lens including a central portion formed with a first hydrous soft material, and a peripheral portion formed with a second hydrous soft material of the present invention, in which the first hydrous soft material is obtained by curing a first curable composition including a silicone-containing monomer, the method including immersing the hybrid soft contact lens in a hydration treatment liquid, and the hydration treatment liquid employed being capable of giving the difference between the rate of size change (A') of the first hydrous soft material and the rate of size change (B') of the second hydrous soft material determined according to the following formula (1') being no greater than 0.05:

Rate of size change=Diameter (mm) of a plate immersed in the hydration treatment liquid after being subjected to the hydration treatment with the hydration treatment liquid/Diameter (mm) of the plate prior to the hydration treatment     (1')

According to the hydration treatment method, due to the restricted difference between the rate of size change (A') of the first hydrous soft material and the rate of size change (B') of the second hydrous soft material to fall within a certain range, the lens can be prevented from deformation since the lens is almost homogeneously swollen when a hybrid soft contact lens in a dry state is hydrated with this hydration treatment liquid.

In the hydration treatment method, the hydration treatment liquid capable of giving the ratio (B'/A') of the rate of size change (B') of the second hydrous soft material with respect to the rate of size change (A') of the first hydrous soft material being no less than 0.94 and no greater than 1.06 is preferably used. According to the hydration treatment method, deformation of the hybrid soft contact lens can be prevented.

Effects of the Invention

Since the hybrid soft contact lens of the present invention is formed with a hydrous soft material at both the central portion and the peripheral portion, deterioration of wearing feel resulting from the boundary portion to be in contact with the eye can be inhibited. In addition, since a hard material is not used, steam sterilization under pressure is enabled.

Moreover, the method for producing a hybrid soft contact lens of the present invention is suited for the method for producing the hybrid soft contact lens as described above, and particularly, deformation of the lens during the hydration treatment can be reduced. According to the hydration treatment method of a hybrid soft contact lens of the present invention, deformation of the lens during the hydration treatment can be reduced.

DESCRIPTION OF EMBODIMENTS

Figure 1:
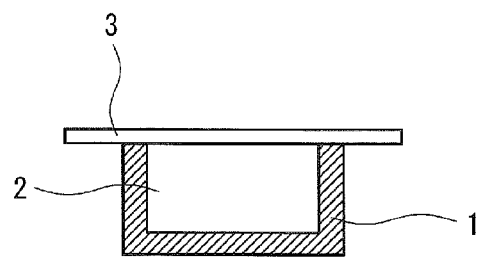
FIG. 1 shows a schematic view illustrating a procedure of the step of forming a first hydrous soft material in Examples.

Hereinafter, preferred modes for carrying out the present invention are explained in detail in the order of a hybrid soft contact lens, and a production method thereof. It should be noted that the description of the production method is accompanied by detailed description of a hydration treatment method of a hybrid soft contact.

<Hybrid Soft Contact Lens>

The hybrid soft contact lens of the present invention includes a central portion formed with a first hydrous soft material, and a peripheral portion formed with a second hydrous soft material.

According to the hybrid soft contact lens, both the central portion and the peripheral portion are formed with a hydrous soft material; therefore, deterioration of wearing feel resulting from the boundary portion to be in contact with the eye can be inhibited. In addition, since the hybrid soft contact lens does not use a hard material, steam sterilization under pressure is enabled.

In the hybrid soft contact lens, the Young's modulus of the first hydrous soft material is preferably different from the Young's modulus of the second hydrous soft material. Specifically, when the Young's modulus of the central portion (first hydrous soft material) is adjusted to be higher than the Young's modulus of the peripheral portion (second hydrous soft material) (to be harder than conventional soft contact lenses), corrective force is increased. It is to be noted that the Young's modulus of the first and second hydrous soft materials as referred to herein means the value measured in a hydrated state.

The Young's modulus of the central portion (first hydrous soft material) is preferably no less than 3.0 MPa and no greater than 100 MPa, and more preferably no less than 3.0 MPa and no greater than 65 MPa. When the Young's modulus of the central portion (first hydrous soft material) is lower than aforementioned lower limit, the correcting effect of the cornea may not be achieved. In contrast, when the Young's modulus of the central portion (first hydrous soft material) is higher than the aforementioned upper limit, uncomfortable wearing feeling may be generated since the pressure caused from the eyelid upon Blinking is converged to the boundary portion. Furthermore, preferable Young's modulus values of the peripheral portion (second hydrous soft material) is no less than 0.20 MPa and less than 3.0 MPa. When the Young's modulus of the peripheral portion (second hydrous soft material) is less than the aforementioned lower limit, application of the lens may be difficult due to failure in maintaining the shape of the peripheral portion. When the Young's modulus of the peripheral portion (second hydrous soft material) is greater than the aforementioned upper limit, the wearing feel may be deteriorated. Also, according to the hybrid soft contact lens, due to the Young's modulus of the first and second hydrous soft material falling within the above range, deterioration of the wearing feel can be further inhibited since the difference in shape distortion that may occur upon application of force can be smaller.

In the hybrid soft contact lens, the difference between the rate of size change (A) of the first hydrous soft material and the rate of size change (B) of the second hydrous soft material determined according to the following formula (1) may be no greater than 0.05, and even more preferably no greater than 0.04:

Rate of size change=Diameter (mm) of a plate immersed in physiological saline at 20° C. after being subjected to a hydration treatment/Diameter (mm) of the plate prior to the hydration treatment (1)

According to the hybrid soft contact lens, due to the difference between the rates of size change of the first hydrous soft material and the second hydrous soft material falling within the above range, the stress applied to the boundary portion is relaxed, and thus deformation of the lens can be inhibited which results from change in the water content that occurs during the hydration treatment or when dried.

A plate employed when the rate of size change is determined is a flat cylinder having a diameter of 12 mm and a thickness of 0.2 mm before subjecting to the hydration treatment (dry state).

The ratio (B/A) of the rate of size change (B) of the second hydrous soft material with respect to the rate of size change (A) of the first hydrous soft material may be no less than 0.94 and no greater than 1.06, and more preferably no less than 0.95 and no greater than 1.05. When the ratio of the rate of size change of falls within the above range, the hybrid soft contact lens can be further prevented from the deformation with respect to the change in the water content as described above.

With respect to the oxygen permeability coefficient (Dk) of the hybrid soft contact lens of the present invention, sum of Dk of the central portion (first hydrous soft material)×(area of the central portion/total area) and Dk of the peripheral portion (second hydrous soft material)×(area of the peripheral portion/total area) is preferably at least $30 \times 10^{-11}$ $(cm^2/sec) \cdot (mLO_2/(mL \times mmHg))$.

In the case of conventional hybrid lenses including a hard portion (central portion) and a soft portion (peripheral portion), oxygen permeability is extremely low since the soft portion does not include a silicone component that is responsible for high oxygen permeability. Therefore, the oxygen permeability coefficient (Dk) has been expressed only for the hard portion, but the oxygen permeability coefficient (Dk) as referred to herein is represented by the sum of those at the central portion and the peripheral portion as described above. In this regard, even if a lens having a high Dk value at the central portion can be obtained, greater part of the lens covering the cornea corresponds to the peripheral portion; therefore, the amount of oxygen supply to the cornea becomes consequently scarce. Moreover, it has been possible to add a silicone component to the peripheral portion also in the case of conventional hybrid lenses; however, resulting from the failure in size change at the central portion (hard portion), a water soluble agent for adjusting the rate of size change has been necessary so as to correspond to the moisture content of the peripheral portion added in order to prevent jellyfish-like deformation. However, when a silicone component is included, due to decreases in solubility of the corresponding water soluble agent for adjusting the rate of size change, setting of the moisture content is restricted according to conventional procedures. To the contrary, the hybrid soft contact lens of the present invention enables addition of the silicone component to both the central portion and the peripheral portion, and thus oxygen permeability can be imparted to the entirety of the lens.

The shape of the central portion is usually circular or elliptic. The diameter (or major axis in the case of ellipse) is preferably 3 to 14 mm, and more preferably 4 to 12 mm. When this length is less than 3 mm, favorable eyesight may not be achieved upon dilatation of pupil as the pupil size becomes greater than the optical part. Also, when this length exceeds 14 mm, taking out the kens may be difficult. When this length falls within the range of 4 to 12 mm, favorable eyesight can be achieved also upon dilation of pupillary, with favorable wearing feel. On the other hand, also the entire shape of the hybrid soft contact lens including the peripheral portion is usually circular or elliptic. The diameter (or major axis in the case of ellipse) is preferably no greater than 20 mm. This length exceeding 20 mm may lead to difficulty in application.

In the hybrid soft contact lens, as described in detail later in connection with the production method, for example, the central portion is formed with a first hydrous soft material obtained by curing a first curable composition, and the peripheral portion is formed with a second hydrous soft material obtained by curing a second curable composition. In the first and the second curable compositions, a monomer for general ophthalmic lenses, as well as components similar to those used in forming common contact lenses, particularly, hydrous soft contact lenses may be used.

Also, examples of combination of the first hydrous soft material and the second hydrous soft material include the following combinations.

First hydrous soft material/Second hydrous soft material
silicone-containing nonionic/silicone-containing nonionic
silicone-containing ionic/silicone-containing ionic
silicone-containing nonionic/silicone-containing ionic
silicone-containing ionic/silicone-containing nonionic
silicone-containing ionic/silicone-noncontaining ionic
silicone-containing ionic/silicone-noncontaining nonionic
silicone-containing nonionic/silicone-noncontaining ionic
silicone-containing nonionic/silicone-noncontaining nonionic The first curable composition for obtaining the first hydrous soft material (central portion) includes at least one type of silicone-containing monomer. It should be noted that the silicone-containing monomer may be included in the second curable composition.

When the first curable composition includes at least one type of silicone-containing monomer, the obtained hybrid soft contact lens would have a high oxygen permeability coefficient (Dk), and thus oxygen supply to the cornea can be favorably performed in continuous wearing.

Examples of the silicone-containing monomer include styrene derivatives having a silane or siloxane bond represented by the above general formula (I), (meth)acrylate having a silane or siloxane bond represented by the following general formula (II), polysiloxane macromonomers, and urethane bond-containing polysiloxane macromonomers but not limited thereto. Among these, since a high oxygen permeability coefficient for a polymer that forms the central portion (first hydrous soft material) can be achieved, the styrene derivatives having a silane or the siloxane bond represented by the above general formula (I), and (meth)acrylate having a siloxane bond represented by the following general formula (II) are preferred.

[chemical formula 2]

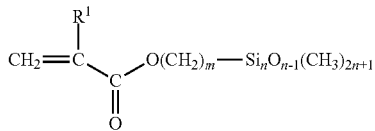
(II)

(in the above formula (II), $R^1$ represents H or $CH_3$; m is 1 to 5; and n is an integer of 1 to 15.)

In this regard, "(meth)acrylate" as referred to herein means "acrylate and/or methacrylate", and the same is applied to other (meth)acrylate derivatives.

Specific examples of the styrene derivative having a silane or siloxane bond represented by the general formula (I) include trimethylsilylstyrene, pentamethyldisiloxanylstyrene, heptamethyltrisiloxanylstyrene, nonamethyltetrasiloxanylstyrene, pentadecamethylheptasiloxanylstyrene, heneicosamethyldecasiloxanylstyrene, heptacosamethyltridecasiloxanylstyrene, hentriacontamethylpentadecasiloxanylstyrene, bis(trimethylsiloxy)methylsilylstyrene, tris(trimethylsiloxy)silylstyrene, trimethylsiloxy•pentamethyldisiloxy•methylsilylstyrene, tris(pentamethyldisiloxy)silylstyrene, (tris•trimethylsiloxy)siloxanyl•bis(trimethylsiloxy)silylstyrene, bis(heptamethyltrisiloxy)methylsilylstyrene, tris(methylbis•trimethylsiloxy•siloxy)silylstyrene, trimethylsiloxy•bis(tris•trimethylsiloxy•siloxy)silylstyrene, heptakis(trimethylsiloxy)trisiloxanylstyrene, nonamethyltetrasiloxy•undecylmethylpentasiloxy• methylsilylstyrene, tris(tris•trimethylsiloxy•siloxy)silylstyrene, (tristrimethylsiloxy•hexamethyl)tetrasiloxy•(tris•trimethylsiloxy)siloxy•trimethylsiloxysilylstyrene, nonakis(trimethylsiloxy)tetrasiloxanylstyrene, bis(tridecamethylhexasiloxy)methylsilylstyrene, and the like. These may be used either alone, or as a mixture of two or more thereof. In particular, tris(trimethylsiloxy)silylstyrene (p=0, n=4) is preferred due to having a superior oxygen permeability coefficient.

The content of the silicone-containing monomer represented by the above formula (I) in the first curable composition is preferably no less than 30% by mass and no greater than 70% by mass, and more preferably no less than 35% by mass and no greater than 60% by mass. In the first curable composition, by including the silicone-containing monomer represented by the above formula (I) and having a benzene ring within such a range, appropriate oxygen permeability, as well as appropriate hardness and Young's modulus as desired can be efficiently imparted to the first hydrous soft material.

Specific examples of the (meth)acrylate having a silane or siloxane bond represented by the general formula (II) include trimethylsilylmethyl(meth)acrylate, trimethylsilylethyl(meth)acrylate, trimethylsilylpropyl(meth)acrylate, pentamethyldisiloxanylmethyl(meth)acrylate, pentamethyldisiloxanylethyl(meth)acrylate, pentamethyldisiloxanylpropyl(meth)acrylate, methylbis(trimethylsiloxy)silylmethyl(meth)acrylate, methylbis(trimethylsiloxy)silylethyl(meth)acrylate, methylbis(trimethylsiloxy)silylpropyl(meth)acrylate, tris(trimethylsiloxy)silylmethyl(meth)acrylate, tris(trimethylsiloxy)silylethyl(meth)acrylate, tris(trimethylsiloxy)silylpropyl(meth)acrylate, mono[methylbis(trimethylsiloxy)siloxy]bis(trimethylsiloxy)silylmethyl(meth)acrylate, mono[methylbis(trimethylsiloxy)siloxy]bis(trimethylsiloxy)silylethyl(meth)acrylate, mono[methylbis(trimethylsiloxy)siloxy]bis(trimethylsiloxy)silylpropyl(meth)acrylate, tris[methylbis(trimethylsiloxy)siloxy]silylmethyl(meth)acrylate, tris[methylbis(trimethylsiloxy)siloxy]silylethyl(meth)acrylate, tris[methylbis(trimethylsiloxy)siloxy]silylpropyl(meth)acrylate, and the like. In particular, due to having a superior oxygen permeability coefficient, tris(trimethylsiloxy)silylpropyl(meth)acrylate (m=3, n=4) is preferred.

When further improvement of the oxygen permeability of the resulting hybrid soft contact lens is intended, a polysiloxane macromonomer may be used. Also, when an urethane bond-containing polysiloxane macromonomer is used as the hybrid soft contact lens material, properties for improving the mechanical strength can be imparted by the siloxane moiety through reinforcement without impairing the flexibility and oxygen permeability of the material, bringing elastic resilience to evade the brittleness, and providing an elastic bond on behalf of the urethane bond.

The urethane bond-containing polysiloxane macromonomer has an ethylenic unsaturated group as a polymerizable group at both two ends of the molecule, and is copolymerized with other polymerizable component via such a polymerizable group; therefore, it has superior properties of imparting to the resulting ophthalmic lens such as not only a physical reinforcement effect owing to the molecular entanglement, but also a reinforcing effect due to the chemical bond (covalent bond). In other words, the urethane bond-containing polysiloxane macromonomer serves as a high molecular crosslinkable monomer.

Examples of the urethane bond-containing polysiloxane macromonomer include polysiloxane macromonomers represented by the general formula (1), in which a polymerizable group is bound to the siloxane main chain via one or more urethane bonds.

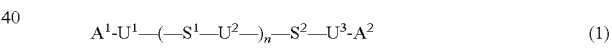
(1)

in the formula, $A^1$ is a group represented by the general formula (2):

(2)

(in the formula, $Y^{21}$ represents a (meth)acryloyl group, a vinyl group or an allyl group, $Z^{21}$ represents an oxygen atom or a direct bond, and $R^{31}$ represents a direct bond or an alkylene group having a linear, branched chain or aromatic ring having 1 to 12 carbon atoms).

$A^2$ represents a group represented by the general formula (3):

(3)

(in the formula, $Y^{22}$ represents a (meth)acryloyl group, a vinyl group or an allyl group, $Z^{22}$ represents an oxygen atom or a direct bond, $R^{34}$ represents a direct bond or an alkylene group having a linear, branched chain or aromatic ring having 1 to 12 carbon atoms); however, $Y^{21}$ in the general formula (2) and $Y^{22}$ in the general formula (3) may be the same or different).

$U^1$ represents a group represented by the general formula (4):

(4)

(in the formula, $X^{21}$ and $X^{25}$ are each independently selected from a direct bond, an oxygen atom and an alkylene glycol group; $E^{21}$ represents a —NHCO-group (however, wherein, $X^{21}$ represents a direct bond, $X^{25}$ represents an oxygen atom or an alkylene glycol group, and $E^{21}$ forms an urethane bond together with $X^{25}$), a —CONH-group (however, wherein, $X^{21}$ represents an oxygen atom or an alkylene glycol group, $X^{25}$ represents a direct bond, and $E^{21}$ forms an urethane bond together with $X^{21}$) or a bivalent group derived from diisocyanate selected from saturated or unsaturated aliphatic, alicyclic and aromatic groups (however, wherein, $X^{21}$ and $X^{25}$ are each independently selected from an oxygen atom and an alkylene glycol group, and $E^{21}$ forms two urethane bonds between $X^{21}$ and $X^{25}$); and $R^{32}$ represents an alkylene group having 1 to 6 carbon atoms which is linear or has a branched chain).

$S^1$ and $S^2$ each independently represent a group represented by the general formula (5):

[chemical formula 3]

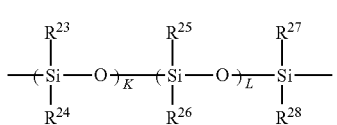

(in the formula, $R^{23}$, $R^{24}$, $R^{25}$, $R^{26}$, $R^{27}$ and $R^{28}$ each independently represent an alkyl group having 1 to 6 carbon atoms, a fluorine-substituted alkyl group or a phenyl group; K is an integer of 10 to 100; L is 0 or an integer of 1 to 90; and K+L is an integer of 10 to 100).

$U^2$ represents a group represented by the general formula (6):

(in the formula, $R^{37}$ and $R^{38}$ each independently represent an alkylene group having 1 to 6 carbon atoms which is linear or has a branched chain; $X^{27}$ and $X^{28}$ each independently represent an oxygen atom or an alkylene glycol group; $E^{24}$ represents a bivalent group derived from diisocyanate selected from saturated or unsaturated aliphatic, alicyclic and aromatic groups (however, wherein, $E^{24}$ forms two urethane bonds between $X^{27}$ and $X^{28}$).

$U^3$ represents a group represented by the general formula (7):

(in the formula, $R^{33}$ represents an alkylene group having 1 to 6 carbon atoms which is linear or has a branched chain, $X^{22}$ and $X^{26}$ are each independently selected from a direct bond, an oxygen atom and an alkylene glycol group; $E^{22}$ represents a —NHCO-group (however, wherein, $X^{22}$ represents an oxygen atom or an alkylene glycol group, $X^{26}$ represents a direct bond, and $E^{22}$ forms an urethane bond together with $X^{22}$) a —CONH-group (however, wherein, $X^{22}$ represents a direct bond, $X^{26}$ represents an oxygen atom or an alkylene glycol group, $E^{22}$ forms an urethane bond together with $X^{26}$) or a bivalent group derived from diisocyanate selected from saturated or unsaturated aliphatic, alicyclic and aromatic groups (however, wherein, $X^{22}$ and $X^{26}$ are each independently selected from an oxygen atom and an alkylene glycol group, $E^{22}$ forms two urethane bonds between $X^{22}$ and $X^{26}$).

n is 0 or an integer of 1 to 10.

In the general formula (1), $A^1$ represents, as described above, a group represented by the general formula (2):

(in the formula, $Y^{21}$, $Z^{21}$ and $R^{31}$ are as defined above), and $A^2$ represents a group represented by the general formula (3):

(in the formula, $Y^{22}$, and $R^{34}$ are as defined above).

$Y^{21}$ and $Y^{22}$ both represent a polymerizable group, and particularly preferably an acryloyl group in light of possibility of easily copolymerizing with a hydrophilic monomer.

$Z^{21}$ and $Z^{22}$ both represent an oxygen atom or a direct bond, and preferably an oxygen atom.

$R^{31}$ and $R^{34}$ both represent a direct bond or an alkylene group having 1 to 12 carbon atoms which is linear or has a branched chain or aromatic ring, and preferably an ethylene group, a propylene group or a butylene group.

$U^1$, $U^2$ and $U^3$ represent a group including an urethane bond in the molecular chain of the macromonomer.

In $U^1$ and $U^3$, $E^{21}$ and $E^{22}$ each represent, as described above, a —CONH-group, a —NHCO-group or a bivalent group derived from diisocyanate selected from saturated or unsaturated aliphatic, alicyclic and aromatic groups. Wherein, examples of the bivalent group derived from diisocyanate selected from saturated or unsaturated aliphatic, alicyclic and aromatic groups include: saturated aliphatic bivalent groups derived from diisocyanate such as ethylene diisocyanate, 1,3-diisocyanatepropane and hexamethylene diisocyanate; alicyclic bivalent groups derived from diisocyanate such as 1,2-diisocyanatecyclohexane, bis(4-isocyanatecyclohexyl)methane and isophorone diisocyanate; aromatic bivalent groups derived from diisocyanate such as tolylene diisocyanate and 1,5-diisocyanatenaphthalene; unsaturated aliphatic bivalent groups derived from diisocyanate such as 2,2'-diisocyanatediethyl fumarate. Of these, bivalent groups derived from hexamethylene diisocyanate, bivalent groups derived from tolylene diisocyanate and bivalent groups derived from isophorone diisocyanate are preferred since they are comparatively easily available, and capable of readily imparting strength.

In $U^1$, when $E^{21}$ represents a —NHCO-group, $X^{21}$ represents a direct bond; $X^{25}$ represents an oxygen atom or an alkylene glycol group; and $E^{21}$ forms an urethane bond represented by the formula: —NHCOO— together with $X^{25}$. Further, when $E^{21}$ represents a —CONH-group, $X^{21}$ represents an oxygen atom or an alkylene glycol group; $X^{25}$ represents a direct bond; and $E^{21}$ forms an urethane bond represented by the formula: —OCONH— together with $X^{21}$. Still further, when $E^{21}$ represent the aforementioned bivalent group derived from diisocyanate, $X^{21}$ and $X^{25}$ are each independently selected from an oxygen atom and an alkylene glycol group preferably having 1 to 6 carbon atoms; $E^{21}$ forms two urethane bonds between $X^{21}$ and $X^{25}$; and $R^{32}$ represents an alkylene group having 1 to 6 carbon atoms which is linear or has a branched chain.

In $U^2$, $E^{24}$ represents as described above, a bivalent group derived from diisocyanate selected from saturated or unsaturated aliphatic, alicyclic and aromatic groups. Wherein, examples of the bivalent group derived from diisocyanate selected from saturated or unsaturated aliphatic, alicyclic and aromatic groups include bivalent groups similar to those in the aforementioned $U^1$ and $U^3$. Of these, bivalent groups derived from hexamethylene diisocyanate, bivalent groups derived from tolylene diisocyanate and bivalent groups derived from isophorone diisocyanate are preferred since they are comparatively easily available, and capable of readily imparting strength. Additionally, $E^{24}$ forms two urethane bonds between $X^{27}$ and $X^{28}$, $X^{27}$ and $X^{28}$ each independently represent an oxygen atom or preferably an alkylene glycol group having 1 to 6 carbon atoms, and $R^{37}$ and $R^{38}$ each independently represent an alkylene group having 1 to 6 carbon atoms which is linear or has a branched chain.

In $U^3$, $R^{33}$ represents an alkylene group having 1 to 6 carbon atoms which is linear or has a branched chain. When $E^{22}$ represents a —NHCO-group, $X^{22}$ represents an oxygen atom or an alkylene glycol group; $X^{26}$ represents a direct bond; and $E^{22}$ forms an urethane bond represented by the formula: —NHCOO— together with $X^{22}$. Further, when $E^{22}$ represents a —CONH-group, $X^{22}$ represents a direct bond; $X^{26}$ represents an oxygen atom or an alkylene glycol group; and $E^{22}$ forms an urethane bond represented by the formula: —OCONH— together with $X^{26}$. Still further, when $E^{22}$ represents the aforementioned bivalent group derived from diisocyanate, $X^{22}$ and $X^{26}$ are each independently selected from an oxygen atom and an alkylene glycol group preferably having 1 to 6 carbon atoms; and $E^{22}$ forms two urethane bonds between $X^{22}$ and $X^{26}$.

Wherein, the alkylene glycol preferably having 1 to 20 carbon atoms in $X^{21}$, $X^{25}$, $X^{27}$, $X^{28}$, $X^{22}$ and $X^{26}$ described above is exemplified by groups represented by the general formula (8):

(in the formula, x is an integer of 1 to 4, and y is an integer of 1 to 5), and the like.

Both $S^1$ and $S^2$ are a group represented by the general formula (5) as described above.

In the general formula (5), $R^{23}$, $R^{24}$, $R^{25}$, $R^{26}$, $R^{27}$ and $R^{28}$, as described above, each independently represent an alkyl group having 1 to 6 carbon atoms, or a fluorine-substituted alkyl group or phenyl group.

Examples of the fluorine-substituted alkyl group include alkyl groups with a trifluoromethylated terminal carbon atom, such as a 3,3,3-trifluoro-n-propyl group, a 1,1,1-trifluoroisopropyl group, a 4,4,4-trifluoro-n-butyl group, a 3,3,3-trifluoroisobutyl group, a 3,3,3-trifluoro-sec-butyl group, a 3,3,3-trifluoro-t-butyl group, a 5,5,5-trifluoro-n-pentyl group, a 4,4,4-trifluoroisopentyl group, a 3,3,3-trifluorothiopentyl group and a 6,6,6-trifluoro-n-hexyl group, and the like. It is to be noted that in the present invention, use of such a compound having a fluorine-substituted alkyl group and increase in the amount of the compound blended tend to improve lipid-deposit resistance of the resultant hydrous soft material.

Moreover, preferably, K is an integer of 10 to 100 and L is 0 or an integer of 1 to 90, and K+L is preferably an integer of 10 to 100, and more preferably 10 to 80. When K+L is greater than 100, the molecular weight of the urethane group-containing polysiloxane macromonomer becomes so great that compatibility of the same with the hydrophilic monomer is deteriorated, whereby it is not homogeneously dissolved in blending, and phase separation may occur in polymerization to exhibit opacity, leading to tendency of failure in producing a uniform and transparent ophthalmic lens material. In contrast, when K+L is less than 10, oxygen permeability of the resultant contact lens may be inferior, and flexibility also tends to be lowered.

Furthermore, n is preferably 0 or an integer of 1 to 10. When n is greater than 10, the molecular weight of the urethane group-containing polysiloxane macromonomer becomes so great that compatibility of the same with the hydrophilic monomer is deteriorated, whereby it is not homogeneously dissolved in blending, and phase separation may occur in polymerization to exhibit opacity, leading to tendency of failure in producing a uniform and transparent contact lens. n is more preferably 0 or an integer of 1 to 5.

Additionally, examples of the urethane bond-containing polysiloxane macromonomer also include polysiloxane macromonomers represented by the general formula (9), in which a polymerizable group is bound to the siloxane main chain via one or more urethane bonds.

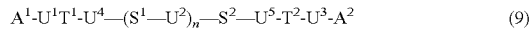

in the formula, $A^1$, $A^2$, $U^1$, $U^2$, $U^3$, $S^1$, $S^2$, and n are as defined in the general formula (1), and definitions of $U^4$ and $U^5$ are the same as those of $U^1$ and $U^3$, respectively. However, $Y^{21}$ and $Y^{22}$ in $A^1$ and $A^2$ are a (meth)acryloyl group, a vinyl group or an allyl group.

$T^1$ and $T^2$ are a hydrophilic polymer-containing segment or a hydrophilic oligomer-containing segment represented by the general formula (10):

(in the formula, D represents a hydrogen atom, a methyl group or a hydroxyl group; Q represents a direct bond or an oxygen atom; and n is 5 to 10,000); or by the general formula (11):

(in the formula, M represents a structure unit derived from a hydrophilic monomer selected from 1-methyl-3-methylene-2-pyrrolidinone (N-MMP), N-vinyl-2-pyrrolidone (N-VP), (meth)acrylic acid, (meth)acrylic acid salt, N,N-dimethylacrylamide, N,N-diethylacrylamide, 2-hydroxyethyl(meth)acrylate, tetrahydrofuran, oxetane, oxazoline, 2-methacryloyloxyethylphosphorylcholine and the like; the polymerizing chain of the polymer constituted therefrom may be either linear or branched, or may be linked randomly or as a block; and X is 5 to 10,000).

The urethane bond-containing polysiloxane macromonomer may further have a hydrophilic polymer structure. This structure improves compatibility of the urethane bond-containing polysiloxane macromonomer with the hydrophilic monomer, and thus can improve wettability with water of the material consisting of these. Examples of the hydrophilic polymer structure include polymer structures obtained by polymerizing a hydrophilic monomer such as polyethylene glycol, polypropylene glycol, polyvinyl alcohol, polyvinylpyrrolidone, poly(meth)acrylic acid, poly(meth)acrylic acid salt, poly (2-hydroxyethyl(meth)acrylate), polytetrahydrofuran, polyoxetane, polyoxazoline, polydimethylacrylamide and polydiethylacrylamide; polymer structures obtained by polymerizing a zwitterionic group-containing monomer such as poly(2-methacryloyloxyethylphosphorylcholine), and the like. The hydrophilic polymer structure moiety has a molecular weight of preferably 100 to 1,000,000, and more preferably 1,000 to 500,000. When the molecular weight is less than 100, imparting hydrophilicity to the urethane group-containing polysiloxane macromonomer that is sufficient for dissolving in the hydrophilic monomer is likely to be impossible. On the other hand, when the molecular weight exceeds 1,000,000, hydrophilic and hydrophobic domains become so large that a transparent contact lens is less likely to be obtainable.

Typical examples of the urethane bond-containing polysiloxane macromonomer include compounds represented by the formula:

[chemical formula 4]

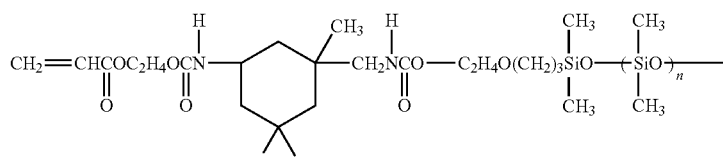

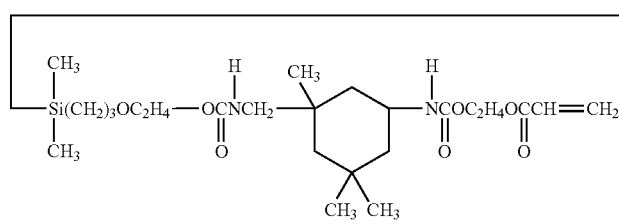

(in the formula, n is 0 or 1 to 1500),
compounds represented by the formula:

[chemical formula 5]

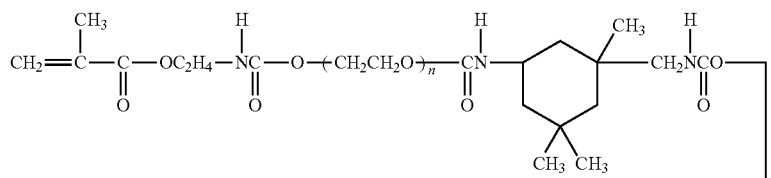

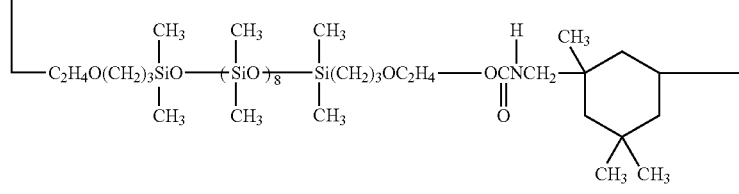

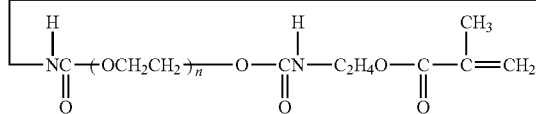

(in the formula, n is 0 to 10), and the like. These may be used either alone, or as a mixture of two or more thereof.

The amount of the silicone-containing monomer in the first curable composition is preferably 20 to 90% by mass, and more preferably 25 to 70% by mass in the entire polymerizable components of the first curable composition. When this amount is too large, the lens is likely to be stained due to adhesion of lipids to the lens. Whereas, when the amount of the silicone-containing monomer is too small, the oxygen permeability coefficient is likely to be small, and thus the amount of oxygen supply tends to be reduced.

The amount of the silicone-containing monomer in the second curable composition is preferably 0 to 80% by mass, and more preferably 10 to 60% by mass in the entire polymerizable components of the second curable composition. When this amount is too large, stiffness occurs, and wearing feel is deteriorated.

In the hybrid soft contact lens of the present invention, the first curable composition and the second curable composition preferably include at least one type of common hydrophilic monomer. In this regard, the hydrophilic monomer refers to a monomer having a water-bearing property with a moisture content of no less than 5% of the homopolymer thereof.

When the first curable composition and the second curable composition include at least one type of common hydrophilic monomer, for example, in the production method (1) described later, when either the central portion (first curable composition) or the peripheral portion (second curable composition) is polymerized beforehand, the other monomer mixture is likely to be impregnated into a part where the polymer was already formed, thereby enabling a hybrid soft contact lens having enhanced joint strength between the central portion and the peripheral portion to be obtained.

Examples of the hydrophilic monomer include (1) hydroxyl group-containing alkyl(meth)acrylates (e.g., hydroxyalkyl(meth)acrylate such as hydroxymethyl(meth)acrylate, hydroxyethyl(meth)acrylate, hydroxypropyl(meth)acrylate, hydroxybutyl(meth)acrylate and hydroxypentyl (meth)acrylate, dihydroxyalkyl(meth)acrylate such as dihydroxypropyl(meth)acrylate, dihydroxybutyl(meth)acrylate and dihydroxypentyl(meth)acrylate), (2) (meth)acrylamide monomers (e.g., N,N-dialkyl(meth) acrylamide such as N,N-dimethyl(meth)acrylamide, N,N-diethyl(meth)acrylamide and N,N-dipropyl(meth)acrylamide N,N-dialkylaminoalkyl(meth)acrylamide such as N,N-dimethylaminopropyl(meth)acrylamide and N,N-diethylaminopropyl(meth)acrylamide), (3) N-vinyllactams (e.g., N-vinylpyrrolidone, N-vinylpiperidone, N-vinylcaprolactam, etc.), (4) hydrophilic monomers except for the above (1) to (3) (e.g., diethylene glycol mono(meth)acrylate, triethylene glycol mono(meth)acrylate, propylene glycol mono(meth)acrylate, (meth)acrylic acid, methoxyethyl(meth)acrylate, ethoxyethyl(meth)acrylate, maleic anhydride, maleic acid, maleic acid derivatives, fumaric acid, fumaric acid derivatives, aminostyrene, hydroxystyrene), and the like, which may be used either alone, or as a mixture of two or more thereof. Among all, hydroxyl group-containing alkyl(meth)acrylates are preferred in light of: use as basic materials of conventional contact lenses; having appropriate moisture content and ease in adjusting the moisture content, and impregnation of the joining portion readily in progress. Of them, hydroxymethyl(meth)acrylate, hydroxyethyl(meth) acrylate, hydroxybutyl(meth)acrylate and hydroxypropyl (meth)acrylate are even more preferred which are hydroxyl group-containing alkyl(meth)acrylates in which the alkyl group has about 1 to 4 carbon atoms.

The amount of the hydrophilic monomer in the first curable composition is preferably 10 to 80% by mass in the entire polymerizable components of the first curable composition. When this amount is too small, hydrophilicity is not sufficiently attained, and thus wettability with water of the lens deteriorates, leading to impairment of the wearing feel since the softening effect by hydration cannot be achieved. In contrast, when the amount is too large, the polymer becomes so soft that the correcting ability of the cornea correct is lowered, resulting in deterioration of the oxygen permeability.

The hybrid contact lens of the present invention has both the central portion and the peripheral portion being hydrous. In order to make both the central portion and the peripheral portion hydrous and soft, these portions are preferably constituted with a material having a moisture content of no less than 10%. In this regard, the moisture content is determined according to the formula of:

Moisture content(%)=[(Mass of polymer after hydration (hydrous soft material)−Mass of polymer before hydration (hydrous soft material))/Mass of polymer after hydration (hydrous soft material)]× 100.

It should be noted that the term "hydrous" refers to a property capable of being hydrated, and the hydrous soft material may be either hydrated, or unhydrated.

The ratio of the moisture content of the hydrophilic monomer as a homopolymer commonly included in the first curable composition and the second curable composition with respect to the moisture content of the polymer (second hydrous soft material) obtained by polymerization of the second curable composition is preferably no greater than 2, and more preferably no greater than 1.5. When the ratio is beyond 2, hydration of the contact lens results in raising of the joining portion between the central portion and the peripheral portion due to topical swelling, thereby leading to failure in providing a preferable contact lens shape. Moreover, this swelling portion may compress the cornea and the wearing feel tends to be deteriorated. Further, the ratio is preferably no less than 0.1. The ratio being less than 0.1 is likely to result in failure in achieving sufficient joint strength at the joining portion between the peripheral portion and the central portion.

Specifically, the moisture content of the polymer (second hydrous soft material) obtained by polymerizing the second curable composition has an eyesight correcting ability, and preferably 5% to 80%, and more preferably 5% to 50% in light of providing favorable wearing feel.

When further improvement of the stain resistance of the obtained contact lens is aimed, a fluorine-containing monomer that is a polymerizable compound in which a part of hydrogen atoms of hydrocarbon groups is substituted with a fluorine atom, and the like may be used. Examples of the fluorine-containing monomer include monomers represented by the general formula (III):

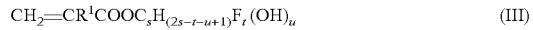
$$CH_2=CR^1COOC_sH_{(2s-t-u+1)}F_t(OH)_u \qquad (III)$$

(in the formula, $R^1$ represents a hydrogen atom or $CH_3$, s is an integer of 1 to 15, t is an integer of 1 to (2s+1), and u is an integer of 0 to 2), and the like.

Typical examples of the monomer represented by the above general formula (III) include 2,2,2-trifluoroethyl (meth)acrylate, 2,2,3,3-tetrafluoropropyl(meth)acrylate, 2,2,3,3-tetrafluoro-t-pentyl(meth)acrylate, 2,2,3,4,4,4-hexafluorobutyl(meth)acrylate, 2,2,3,4,4,4-hexafluoro-t-hexyl(meth) acrylate, 2,3,4,5,5,5-hexafluoro-2,4-bis(trifluoromethyl) pentyl(meth)acrylate, 2,2,3,3,4,4-hexafluorobutyl(meth) acrylate, 1,1,1,3,3,3-hexafluoroisopropyl(meth)acrylate, 2,2,3,3,4,4,4-heptafluorobutyl(meth)acrylate, 2,2,3,3,4,4,5,5-octafluoropentyl(meth)acrylate, 2,2,3,3,4,4,5,5,5-nonafluoropentyl(meth)acrylate, 2,2,3,3,4,4,5,5,6,6,7,7-dodecafluoroheptyl(meth)acrylate, 3,3,4,4,5,5,6,6,7,7,8,8-dodecafluorooctyl(meth)acrylate, 3,3,4,4,5,5,6,6,7,7,8,8,8-tridecafluorooctyl(meth)acrylate, 2,2,3,3,4,4,5,5,6,6,7,7,7-tridecafluoroheptyl(meth)acrylate, 3,3,4,4,5,5,6,6,7,7,8,8,9,9,10,10-hexadecafluorodecyl(meth)acrylate, 3,3,4,4,5,5,6,6,7,7,8,8,9,9,10,10,10-heptadecafluorodecyl(meth)acrylate, 3,3,4,4,5,5,6,6,7,7,8,8,9,9,10,10,11,11-octadecafluoroundecyl(meth)acrylate, 3,3,4,4,5,5,6,6,7,7,8,8,9,9,10,10,11,11,11-nonadecafluoroundecyl(meth)acrylate, 3,3,4,4,5,5,6,6,7,7,8,8,9,9,10,10,11,11,12,12-eicosafluorododecyl(meth) acrylate, 2-hydroxy-4,4,5,5,6,7,7,7-octafluoro-6-trifluoromethyl heptyl(meth)acrylate, 2-hydroxy-4,4,5,5,6,6,7,7,8,9,9,9-dodecafluoro-8-trifluoromethylnonyl(meth) acrylate, 2-hydroxy-4,4,5,5,6,6,7,7,8,8,9,9,10,11,11,11-hexadecafluoro-10-trifluoromethylundecyl(meth)acrylate, and the like.

Among the fluorine-containing monomers described above, in light of superior effects of further improving the stain resistance of the optical material obtained, 2,2,2-trifluoroethyl(meth)acrylate and 1,1,1,3,3,3-hexafluoroisopropyl (meth)acrylate are particularly preferred.

The fluorine-containing monomer may be used either alone, or as a mixture of two or more thereof, and the amount of the same may be appropriately adjusted depending on the properties of the contact lens intended.

According to the present invention, various types of additives generally used conventionally in contact lenses may be added if necessary such as, e.g., a polymerizable or nonpolymerizable ultraviolet ray-absorbing agent, a colorant, an ultraviolet ray absorptive colorant and the like for imparting to the contact lens ultraviolet ray absorptive capacity, or for tinting the contact lens by including in and allowing to copolymerize the polymerizable component (curable composition) that forms the peripheral portion and/or central the portion, or by adding after completing the polymerization. Particularly suggested blends are as in the following.

(1) peripheral portion (second curable composition): ultraviolet ray-absorbing agent central portion (first curable composition): colorant+ultraviolet ray-absorbing agent (2) peripheral portion (second curable composition): colorant+ultraviolet ray-absorbing agent central portion (first curable composition): ultraviolet ray-absorbing agent The content of the ultraviolet ray-absorbing agent and the colorant may be the same or different between the first and the second curable compositions, and taking into consideration significant influences by the thickness of the material, and the like, the contents of the ultraviolet ray-absorbing agent and the colorant are both preferably 0.001 to 1 parts by mass with respect to 100 parts by mass of the entire polymerizable components, in general. However, the content may be adjusted ad libitum depending on the use of the contact lens intended, and not particularly limited thereto.

When the contents of the ultraviolet ray-absorbing agent and colorant are excessively great, the mechanical strength and the like of the contact lens may be deteriorated, also accompanied by a problem of decrease in transparency. Furthermore, when the contact lens is used while bringing into contact with a tissue of a living body, the content may be regulated also taking into consideration the toxicity of the ultraviolet ray-absorbing agent, the colorant and the ultraviolet ray absorptive colorant.

Furthermore, in attempts to impart water resistance and solvent resistance to a contact lens by improving the mechanical strength and durability (shape stability) of the obtained contact lens, a crosslinkable monomer that is a multifunctional polymerizable compound having two or more copolymerizable unsaturated double bonds is preferably used.

Examples of the crosslinkable monomer include ethylene glycol di(meth)acrylate, diethylene glycol di(meth)acrylate, triethylene glycol di(meth)acrylate, propylene glycol di(meth)acrylate, dipropylene glycol di(meth)acrylate, allyl (meth)acrylate, vinyl(meth)acrylate, trimethylolpropane tri (meth)acrylate, methacryloyloxyethyl acrylate, divinylbenzene, diallyl phthalate, diallyl adipate, triallyl isocyanurate, α-methylene-N-vinylpyrrolidone, 4-vinylbenzyl(meth)acrylate, 3-vinylbenzyl(meth)acrylate, 2,2-bis(p-(meth)acryloyloxyphenyl)hexafluoropropane, 2,2-bis(m-(meth)acryloyloxyphenyl)hexafluoropropane, 2,2-bis(o-(meth) acryloyloxyphenyl)hexafluoropropane, 2,2-bis(p-(meth) acryloyloxyphenyl)propane, 2,2-bis(m-(meth) acryloyloxyphenyl)propane, 2,2-bis(o-(meth) acryloyloxyphenyl)propane, 1,4-bis(2-(meth) acryloyloxyhexafluoroisopropyl)benzene, 1,3-bis(2-(meth) acryloyloxyhexafluoroisopropyl)benzene, 1,2-bis(2-(meth) acryloyloxyhexafluoroisopropyl)benzene, 1,4-bis(2-(meth) acryloyloxyisopropyl)benzene, 1,3-bis(2-(meth) acryloyloxyisopropyl)benzene, 1,2-bis(2-(meth) acryloyloxyisopropyl)benzene, and the like.

Among the aforementioned crosslinkable monomers, ethylene glycol di(meth)acrylate and 4-vinylbenzyl(meth)acrylate are particularly preferred in light of superior compatibility with other polymerizable component, and great effects of improving mechanical strength and durability (shape stability) of the resulting contact lens.

The crosslinkable monomer may be used either alone, or as a mixture of two or more thereof, and the amount may be adjusted ad libitum depending on the properties of the contact lens intended. When such a crosslinkable monomer is used, the amount thereof is preferably no less than 0.01% by mass, in particular no less than 0.5% by mass of the entire polymerizable components for particularly achieving an effect of improving durability (shape stability). Whereas, for obviating the possibility of the contact lens to be brittle, the amount of the crosslinkable monomer is preferably no greater than 15% by mass, and in particular no greater than 12% by mass of the entire polymerizable components.

In the hybrid soft contact lens of the present invention, for example, the first and second curable compositions each in a desirable amount are prepared, and thereto is added a radical polymerization initiator followed by allowing for polymerization by a common method, whereby a polymer (hydrous soft material) can be obtained.

In the aforementioned common method, for example, after the radical polymerization initiator is added, the mixture is gradually heated in a temperature range of from room temperature to about 130° C., or irradiated with an electromagnetic wave such as a micro wave, ultraviolet ray, or radioactive ray (γ ray) to perform polymerization. When heat polymerization is performed, the temperature may be elevated stepwise. The polymerization may be carried out by a block polymerization process or a solution polymerization process using a solvent or the like, or by any other process.

Typical examples of the radical polymerization initiator include azobisisobutyronitrile, azobisdimethylvaleronitrile, benzoyl peroxide, t-butyl hydroperoxide, cumene hydroperoxide and the like. These may be used either alone, or as a mixture of two or more thereof. It is to be noted that when polymerization is carried out using light rays or the like, it is preferred that a photo polymerization initiator or a sensitization agent be further added. The amount of the polymerization initiator or the sensitization agent is preferably about 0.01 to 2 parts by mass, and in particular about 0.01 to 1 part by mass with respect to 100 parts by mass of the entire amount of the polymerizable components.

To the second curable composition may be added a water-soluble solid inert substance or water and polymerized for inhibiting deformation resulting from the expansion difference between the central portion and the peripheral portion, more specifically, for the purpose of regulating the size change of the second hydrous soft material in the case of use of combination that is not capable of giving the ratio (B/A) of the rate of size change (B) of the second hydrous soft material with respect to the rate of size change (A) of the first hydrous soft material being no less than 0.94 and no greater than 1.06.

Examples of the water soluble solid inert substance include (1) polyethylene glycol, polypropylene glycol and polybutylene glycol having an average molecular weight of 1,000 to 100,000;

(2) benzoic acid, doluic acid, naphthoic acid;

(3) esters and ethers of polyoxyethylene glycol, polyoxypropylene glycol, polyoxybutylene glycol having an average molecular weight of 100 to 100,000;

(4) soap, surface active agents;

(5) polyvinylpyrrolidone, polyvinylcaprolactam, polyvinylpiperidone;

(6) N-acetylpolyethyleneimine;

(7) poly-N-vinylimidazole, poly-N-vinylsuccinimide, poly-N-vinylglutarimide, and the like.

The water soluble solid inert substances having an average molecular weight of 1,000 to 10,000, and more preferably 2,000 to 6,000 are preferred in light of ease in removal of the water soluble solid inert substance from the contact lens after shaping into the contact lens shape, and cutting processibility (formability) into a contact lens shape. When the water soluble solid inert substance has an average molecular weight of less than 1,000, the cutting processibility (formability) is likely to deteriorate. When the average molecular weight exceeds 10,000, ease in removal of the water soluble solid inert substance from the contact lens after shaping into the contact lens shape is likely to be impaired.

Also, the water soluble solid inert substance is preferably polyethylene glycol, polypropylene glycol or polybutylene glycol having the average molecular weight described above in light of ease in dissolution in the monomer mixture and ease in removal after the polymerization, and of these, polyethylene glycol is more preferred.

<Production Method>

Although the method for producing the hybrid soft contact lens of the present invention is not particularly limited, for example, a method including:

a step of forming the first hydrous soft material for the central portion of the lens by curing the first curable composition;

a step of forming the second hydrous soft material for the peripheral portion of the lens by curing the second curable composition; and a step of shaping a formed product including the first hydrous soft material and the second hydrous soft material into a contact lens shape may be exemplified.

According to the production method, a hybrid contact lens having a central portion and a peripheral portion both formed with a soft material can be efficiently produced. As a curing process and the like of each curable composition in the step of forming the first hydrous soft material and the step of forming the second hydrous soft material, any general process as described above may be adopted.

As a method for obtaining the formed product including the first hydrous soft material and the second hydrous soft material (i.e., integration process of two materials), for example, the following production methods (1) to (3) may be indicated.

Production Method (1)

A method in which in the step of forming the first hydrous soft material and the step of forming the second hydrous soft material, one of these steps is carried out beforehand, and then the other step is carried out while other curable composition is made in contact with the one hydrous soft material thus formed.

According to the production method (1), curing is conducted while a part of the other curable composition is impregnated with one hydrous soft material; therefore, strength of the joining part of the central portion and the peripheral portion of the lens can be enhanced. In addition, since this joining part will have an intermediate softness and rate of size change between both hydrous soft materials, deformation of the lens during the hydration treatment and the like can be suppressed.

In a specific method to employ the production method (1), for example, (a) curing as the peripheral portion, the second curable composition to obtain a polymer having a cylindrical shape (second hydrous soft material) (step of forming the second hydrous soft material), (b) forming in the resulting polymer a through-hole concentric with the external circumference, (c) forming the first hydrous soft material by filling the through-hole with the first curable composition, particularly, the first curable composition containing at least one type of a silicone-containing monomer and curing the composition to give the first hydrous soft material (step of forming the first hydrous soft material), (d) subjecting the polymer thus obtained (formed product including the first hydrous material and the second hydrous soft material) to cutting processing into a contact lens shape (shaping step).

With respect to the aforementioned steps (a), (b) and (c), the peripheral portion having a cylindrical shape provided with a through-hole that is concentric with the external circumference is produced beforehand, and the first curable composition is filled in the through-hole, followed by polymerizing the same in the through-hole. This operation enables the first curable composition to be impregnated into the polymer constituting the peripheral portion (second hydrous soft material) and to be copolymerized while it is impregnated; therefore, the strength of the joining portion between the peripheral portion and the central portion can be enhanced, and the central portion can be provided at the center since the entire processing with the external circumference of the peripheral portion as a basis is enabled.

Alternatively, to the contrary, the second hydrous soft material may be formed while the second curable composition is made in contact with the central portion (first hydrous soft material) provided beforehand. Also in this case, the second curable composition is impregnated into the polymer constituting the central portion (first hydrous soft material), and enables copolymerization while being impregnated; therefore, the strength of the joining portion between the peripheral portion and the central portion can be enhanced.

Production Method (2)

A method in which after the step of forming the first hydrous soft material and the step of forming the second hydrous soft material, the production method further includes a step of integrating the formed first hydrous soft material and second hydrous soft material by allowing both hydrous soft materials to adhere via a third curable composition.

Also such a production method (2) enables the deformation of the lens during the hydration treatment and the like to be suppressed due to the adhesion of the first hydrous soft material and the second hydrous soft material via a third curable composition.

Exemplary process for adhering the first hydrous soft material and second hydrous soft material via the third curable composition may include, for example, the third curable composition is applied on the surfaces of the first hydrous soft material and the second hydrous soft material formed into a plate shape, and the applied faces are overlaid with each other, followed by curing of the third curable composition to allow for adhesion. It should be noted that after applying the third curable composition on the surfaces of the first hydrous soft material and the second hydrous soft material, the applied faces are overlaid with each other preferably for a certain period of time (e.g., 30 sec to 10 min) such that the third curable composition is impregnated into the surfaces of the first and second hydrous soft materials.

Alternatively, the outer periphery face of the first hydrous soft material formed into a cylindrical shape, and the inner circumference face of the second hydrous material formed into a cylindrical shape may be adhered via the third curable composition.

Production Method (3)

A method in which before the step of forming the first hydrous soft material and the step of forming the second hydrous soft material, the production method includes a step of forming a joining layer having an average thickness of no greater than 1 mm by curing a third curable composition, in which the step of forming the first hydrous soft material is carried out while making the first curable composition in contact with one face of the joining layer, and the step of forming the second hydrous soft material is carried out while making the second curable composition in contact with another face of the joining layer.

Also such a production method (3) enables the deformation of the lens during the hydration treatment and the like in the production steps to be suppressed since the first hydrous soft material and the second hydrous soft material are integrated via a joining layer.

In a specific method to employ the production method (3), to both two faces of the joining layer formed into a film shape (plate shape) by curing the third curable composition may be each brought into contact with the first curable composition, and curing may be allowed to form the first hydrous soft material for the central portion of the lens, followed by bringing the second curable composition into contact with another face of the joining layer, and curing may be allowed to form the second hydrous soft material for the peripheral portion of the lens. Any of the first and second hydrous soft materials may be formed first, or both two materials may be simultaneously formed. Also, the shape of the joining layer may be not only the film shape, but, for example, tubular shape, or the like.

It is to be noted that the joining layer formed according to the production method (2) or the production method (3) (in the production method (2), cured matter obtained from the third curable composition) has an average thickness of no less than 0.5 mm, more preferably no less than 0.002 mm and no greater than 0.3 mm, and still more preferably no less than 0.005 mm and no greater than 0.1 mm. When the difference between the rate of size change of the cured matter of the third curable composition, and the rate of size change of the first or second hydrous soft material exceeds 0.05, deformation of the lens resulting from the difference of swelling of the central portion, the peripheral portion and the joining layer may be caused. However, when the joining layer has an average thickness of no greater than 0.5 mm, the lens can be prevented from deformation. On the other hand, when the joining layer has an average thickness of less than 0.002 mm, sufficient adhesiveness may not be attained.

It is to be noted that the average thickness of the joining layer means a distance between the joint face of the joining layer and the first hydrous soft material, and the joint face of the joining layer of the second hydrous soft material, i.e., an interval between the first and the second hydrous soft materials.

The blend composition of the third curable composition used in the production method (2) and the production method (3) is not particularly limited, and any composition containing any of various types of monomers, a crosslinkable monomer, a polymerization initiator and the like may be included, which may be used in general contact lenses as illustrated in connection with the first and second curable compositions as described in the foregoing.

Examples of the monomer which may be suitably used in the third curable composition include 2-hydroxyethyl methacrylate, glycerol methacrylate, glycerol dimethacrylate, hydroxybutyl methacrylate, methyl methacrylate, PEG (polyethylene glycol) 400 diacrylate, and the like. These may be used alone, or as a mixture of two or more thereof.

The crosslinkable monomer which may be suitably used in the third curable composition may include ethylene glycol di(meth)acrylate. The content of the crosslinkable monomer is not particularly limited, and for example, the content is no less than 0.01% by mass and no greater than 5% by mass with respect to the entire polymerizable components.

The polymerization initiator which may be used in the third curable composition may be exemplified by 2,2'-azobis(2,4-dimethylvaleronitrile), and 2-hydroxy-2-methyl-1-phenyl-propan-1-one. The content of the polymerization initiator is not particularly limited, and for example, the content is no less than 0.01% by mass and no greater than 5% by mass with respect to the monomer.

Also, the hybrid soft contact lens of the present invention may be produced using a mold of a multi-material contact lens blank and a preparation process which are disclosed in Japanese Unexamined Patent Application, Publication No. 2000-343539.

Use of this mold enables a multi-material contact lens blank to be formed which is a material capable of providing a multi-material contact lens that exhibits an integral contact lens shape composed of a plurality of polymers at specified lens parts, respectively, by integrally laminating the plurality of polymers.

This mold is characterized by including:

(a) a lower mold having a mold cavity surface for forming a surface of one side of a contact lens blank;

(b) at least one intermediate mold which forms an inside mold cavity molding the aforementioned a plurality of polymers between the intermediate mold and the lower mold, or between the intermediate mold and at least one of the plurality of polymers molded on the mold cavity surface of the lower mold, has a convex part forming a concave part on the polymer molded in the inside mold cavity in which a raw material monomer compounding solution providing a polymer different from polymers molded by polymerization in the inside mold cavity can be contained, and is so structured as to be removable after molding the polymers in the inside mold cavity; and (c) an upper mold which is combined with the lower mold having the polymer molded by using the aforementioned at least one intermediate mold on the mold cavity surface, and molds at least a part of a surface of the other side of the contact lens blank by polymerizing the raw material monomer compounding solution in the concave part, covering the concave part formed in the polymer.

As an agent for adjusting the rate of size change of the material forming the central portion, and the material forming the peripheral portion, an inert substance may be added. In each of the compositions for the peripheral portion and the central portion which had achieved desired physical properties, when a difference in dimension is found upon equilibrium swelling of each composition, the difference in dimension upon equilibrium swelling may be regulated by adding the inert substance in the form of a nonpolymerizable liquid or solid to the composition having a greater rate of size change to form a mimetic equilibrium state at the polymerization stage, and then replacing the inert substance with water by a hydration treatment. Also, in the case in which a period of time until reaching the equilibrium swelling significantly differs, remarkable stress may be applied to both materials in this step, causing plastic deformation (irreversible deformation) due to the stress, whereby a lens shape may not be provided. In such a case, the osmotic pressure in the hydration treatment bath may be lowered stepwise to control the period of time until reaching to equilibrium swelling, and thus the equilibrium swelling state can be attained without causing plastic deformation of the central portion and the peripheral portion. Addition of the inert substance, may be preferably adopted when the difference in LSR (Linear Swelling Rate) is no greater than 30%. When the difference in LSR is greater than 30%, the inert substance may rather reduce the polymerizability of the composition.

In the foregoing production methods (1) to (3), and the like, the difference between the rate of size change (A) of the first hydrous soft material and the rate of size change (B) of the second hydrous soft material determined according to the following formula (1) is preferably no greater than 0.05:

> Rate of size change=Diameter (mm) of a plate immersed in physiological saline at 20° C. after being subjected to a hydration treatment/Diameter (mm) of the plate prior to the hydration treatment (1).

Additionally, in these methods for producing a hybrid soft contact lens, the ratio (B/A) of the rate of size change (B) of the second hydrous soft material with respect to the rate of size change (A) of the first hydrous soft material is preferably no less than 0.94 and no greater than 1.06.

According to the production method, by using the first hydrous soft material and the second hydrous soft material that exhibit approximate rate of size change, deformation of the lens during the hydration treatment after the shaping step, and the like can be further suppressed.

In the production method of the hybrid contact lens of the present invention, according to each method as described in the foregoing, the formed product integrally including the first hydrous material and the second hydrous soft material is shaped (cutting processing, etc.) to give a contact lens shape.

After the step of carrying out a hydration treatment of the hybrid soft contact lens in a dry state subjected to shaping (cutting processing, etc.) to give a contact lens shape by immersing in the hydration treatment liquid, the hybrid soft contact lens can be obtained.

In the step of carrying out the hydration treatment, a combination of the first hydrous soft material, the second hydrous soft material and the hydration treatment liquid may be used, particularly with selecting the hydration treatment liquid, capable of giving the difference between the rate of size change (A') of the first hydrous soft material and the rate of size change (B') of the second hydrous soft material determined according to the following formula (1') being no greater than 0.05:

> Rate of size change=Diameter (mm) of a plate immersed in the hydration treatment liquid after being subjected to the hydration treatment with the hydration treatment liquid/Diameter (mm) of the plate prior to the hydration treatment (1').

According to the production method, by selecting the first and second hydrous materials and the hydration treatment liquid taking into consideration the rate of size change of the first and second hydrous soft materials in this manner, and the like deformation of the lens during the hydration treatment can be further reduced.

In the step of carrying out the hydration treatment, a combination of the first hydrous soft material, the second hydrous soft material and the hydration treatment liquid may be used, particularly with selecting the hydration treatment liquid, capable of giving the ratio (B'/A') of the rate of size change (B') of the second hydrous soft material with respect to the rate of size change (A') of the first hydrous soft material being no less than 0.94 and no greater than 1.06. The production method enables the deformation of the lens during the hydration treatment to be further reduced.

During the hydration treatment, depending on the combination of materials (i.e., the first and second hydrous soft materials), due to a longer period of time required for reaching complete swelling of the central portion as compared with the period of time until the peripheral portion is completely swollen, the difference between the rate of size change of the first hydrous soft material and the rate of size change of the second hydrous soft material may temporarily exceed 0.05 in the step of the hydration treatment. When the difference exceeds 0.05, the stress applied to the peripheral portion may result in plastic deformation of the central portion in the swelling step, and the shape may not be recovered even in the equilibrium swelling state. In such a case, selection of the hydration treatment liquid such that the aforementioned difference does not exceed 0.05 in the hydration treatment step that leads to the equilibrium swelling state enables a lens to be produced without occurrence of plastic deformation at the central portion. For adjusting the difference between the rate of size change of the first hydrous soft material and the rate of size change of the second hydrous soft material, it is possible to utilize the osmotic pressure, and a hydrated polymer-contracting action by the temperature, whereas the pH may be also utilized in the case of ionic polymers. Furthermore, these can be employed in combination, and also the hydration treatment liquid may be changed stepwise during the step that leads to the equilibrium swelling.

The osmotic pressure of the hydration treatment liquid preferably falls within the range of 250 to 5000 mOsm/kg. Also, the temperature in the hydration treatment may be an ambient temperature (about 20° C.) when the liquid having a great effect of changing the dimension by way of the osmotic pressure is used; however, depending on the concentration, the treatment is preferably carried out at a temperature falling within the range of 10 to 70° C. As the hydration treatment liquid, a solution of a nonelectrolytic substance or an electrolytic substance such as a metal salt capable of achieving the aforementioned osmotic pressure, or the like may be used, and preferably a solution of NaCl, sodium bicarbonate (NaHCO$_3$), sodium carbonate, KCl, disodium hydrogen phosphate, potassium dihydrogen phosphate, PBS (−), saccharide, glycerol, urea, ethylene glycol, citric acid, ascorbic acid or the like may be employed.

The difference between the rate of size change of the first hydrous soft material and the rate of size change of the second hydrous soft material may exceed 0.05 under conditions in which lenses are worn, i.e., in the range of 200 to 400 mOsm/kg and the pH of 6 to 8, depending on the combination of the first hydrous soft material and the second hydrous soft material. In this case, a nonpolymerizable water-soluble substance may be added to the blend liquid of the hydrous soft material that alone exhibits a greater rate of change, in an amount such that the aforementioned difference becomes no greater than 0.05. Accordingly, replacement of the added nonpolymerizable water-soluble substance with water in the hydration treatment after the polymerization enables the rate of change of the hydrous soft material having a greater rate of change to be decreased, and thus enables the aforementioned difference upon the equilibrium swelling under the same osmotic pressure and the same temperature to be no greater than 0.05. As the nonpolymerizable water-soluble substance described above, a water soluble solid substance which can be dissolved in the blend liquid, or a water soluble solvent may be used.

When the osmotic pressure is adjusted in the hydration treatment, the agent for adjusting the rate of size change described below may be added, in addition to the aforementioned substance. For example, a hydrocarbon series substance, halogenated hydrocarbon, alcohol, phenol, ether, acetal, ketone, fatty acid, acid anhydride, ester, nitrogen compound, sulfur compound, inorganic solvent, or an inert solid substance that can be dissolved in these solvent may be used as the agent for adjusting the rate of size change, and preferably used may be the water soluble solid substance described above capable of being extracted with water, and a water soluble solvent selected from alcohols having 1 to 4 carbon atoms such as ethanol, methanol, 1-propanol and 2-propanol, and acetone, methyl ethyl ketone, dimethyl formamide, dimethyl sulfoxide, acetonitrile and N-methylpyrrolidone.

EXAMPLES

<<Production of Test Sample>>

Test samples were produced by the following procedure according to the Production Method (1) (see FIG. 1 to FIG. 4).

1. The first curable composition was prepared in accordance with the blend composition shown in Table 1. It is to be noted that the blend ratios shown in the Table are all parts by mass basis (the same is applied in Examples shown in the following). After thus prepared first curable composition 2 was charged in a polypropylene (PP) cup 1, which was sealed with a polyethylene terephthalate (PET) film 3, thermal polymerization was allowed at 60° C. for 1 hour, and then at 80° C. for 1 hour (step of forming the first hydrous soft material: see FIG. 1).

2. The second curable composition was prepared in accordance with the blend composition shown in Table 1.

Figure 2:
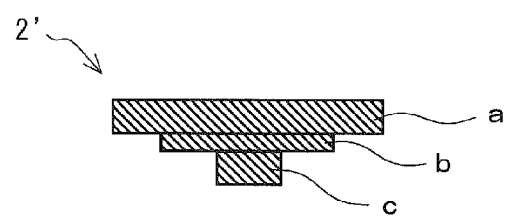
FIG. 2 shows a schematic view illustrating the first hydrous soft material lid processed in Examples.
Figure 3:
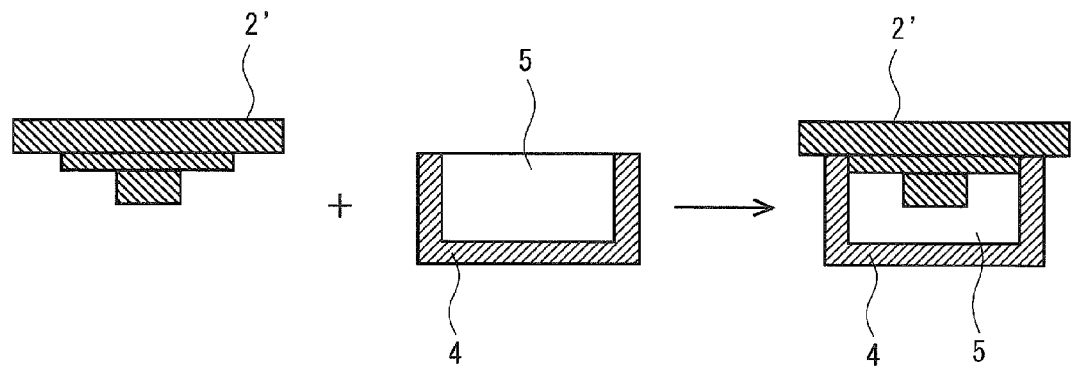
FIG. 3 shows a schematic view illustrating a procedure of the step of forming a second hydrous soft material in Examples.
Figure 4:
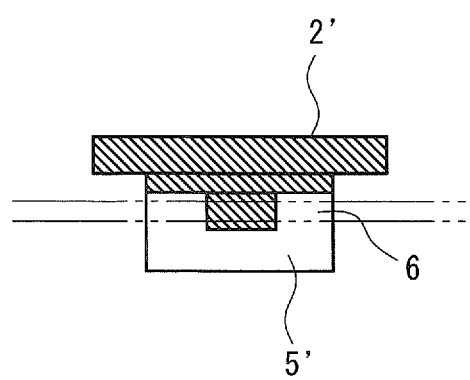
FIG. 4 shows a schematic view illustrating a formed product including the first and second hydrous soft materials in Examples.

3. The polymerized center material (first hydrous soft material 2') was removed from the PP cup 1, and processed (by lid processing) into a laminate structure including coaxial cylinders (a, b and c) having three different diameters as shown in FIG. 2. The size of the coaxial cylinders a, b and c is as presented in the following
   a: the diameter and thickness being arbitrary,
   b: the diameter being equal to the internal diameter of PP cup 4 used in polymerization of the peripheral portion; the thickness being 0.3 mm, and
   c: the diameter being 7 mm; the thickness being mm.

4. A fresh polypropylene (PP) cup 4 was charged with second curable composition 5, and sealed with the center material (first hydrous soft material 2') produced in the above section 3. subjected to the lid processing, followed by thermal polymerization carried out at 60° C. for 1 hour and thereafter at 80° C. for 1 hour (the step of forming the second hydrous soft material: see FIG. 3).

5. A two-material blank produced in the above section 4. (formed product including the integrated first hydrous material 2' and the second hydrous soft material 5') was cut to produce a plate 6 ($\phi$: 12 mm; and thickness: 0.2 mm) (see FIG. 4).

6. The plate 6 produced in the above section 5. was immersed in a hydration treatment liquid shown in Table 2, and allowed to stand still at 40° C.

7. One day later, the plate 6 was removed and rinsed with distilled water, and thereafter immersed in physiological saline at 20° C., followed by allowing to stand still to obtain plates of Production Examples 1 to 6.

<<Determination of Rate of Change>>

Single-material plates (having a diameter of 12 mm and a thickness of 0.2 mm in a dry state)

Materials C1 to C2 for forming the central portion (first hydrous soft materials), and materials P1 to P4 for forming the peripheral portion (second hydrous soft materials) were produced based on the blend compositions shown in Table 1, according to the thermal polymerization conditions of steps 1 and 4 in the above section <<Production of Test Sample>>. The diameter of the plate after subjecting to the hydration treatment was measured in a state being immersed in physiological saline at 20° C., with a projector (manufactured by Nikon Corporation, PROFILE PROJECTOR V-12B). Using the value thus obtained, the rate of size change, and the ratio B/A of the rate of size change were calculated according to the following formula.

Rate of size change=Diameter (mm) of a plate immersed in physiological saline at 20° C. after being subjected to a hydration treatment/Diameter (=12) (mm) of the plate prior to the hydration treatment Ratio of the rate of size change=B/A wherein, A: rate of size change of the material for the central portion (first hydrous soft material); and B: rate of size change of the material for the peripheral portion (second hydrous soft material).

<<Evaluation Criteria of Hydrous Soft Material>>

All evaluations were made by visual inspection. The results are shown in Table 1.

(1) Solubility of Blend Liquid

A: Blend liquid after dissolving being transparent; and

B: Opacity found in blend liquid after dissolving.

(2) Transparency

Transparency was evaluated by visual inspection before the hydration treatment for the transparency (dry), and after the hydration treatment for the transparency (wet).

A: The obtained lens (plate) being transparent; and

B: Opacity found in the obtained lens (plate).

(3) Cutting Property

A: Cutting being easy, with the cut surface being significantly glossy; and

B: Cutting being difficult, with the cut surface being somewhat or less glossy. <<Identification of Shape>>

The plates after subjecting to the hydration treatment were visually observed. The results are shown in Table 2.

TABLE 1

| | First curable composition | | Second curable composition | | | |
|---|---|---|---|---|---|---|
| | C1 | C2 | P1 | P2 | P3 | P4 |
| SiSt | 20 | 15 | — | 7 | 16 | — |
| SiMA | — | — | 38 | 38 | — | 60 |
| Siloxane macromonomer | — | 5 | 17 | — | 42 | 10 |
| DMAA | — | — | 45 | 45 | 42 | 30 |
| N-VP | 16 | 18 | — | 10 | — | — |
| MAA | 4 | 2 | — | — | — | — |
| EDMA | — | — | 0.2 | 0.5 | 0.5 | 0.3 |
| VBMA | 0.2 | 0.2 | — | — | — | — |
| V-65 | 0.3 | 0.2 | 0.2 | 0.2 | 0.2 | 0.1 |
| Mass total | 40.5 | 40.4 | 100.4 | 93.7 | 84.7 | 100.4 |
| Solubility of blend liquid | A | A | A | A | A | A |
| Transparency (dry) | A | A | A | A | A | A |
| Transparency (wet) | A | A | A | A | A | A |
| Cutting property | A | A | A | A | A | A |
| Rate of size change | 1.06 | 1.15 | 1.13 | 1.17 | 1.11 | 1.06 |
| Moisture content (%) | 16.7 | 39 | 34 | 45 | 27 | 7.4 |

It is to be noted that abbreviations in the Table represent the following compounds.

SiSt: tris(trimethylsiloxy)silylstyrene

SiMA: tris(trimethylsiloxy)silylpropyl methacrylate

Siloxane macromonomer: urethane bond-containing polydimethylsiloxane macromonomer represented by the following formula:

[chemical formula 6]

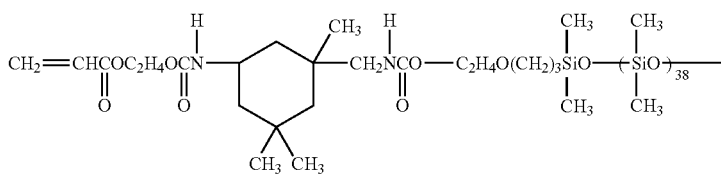

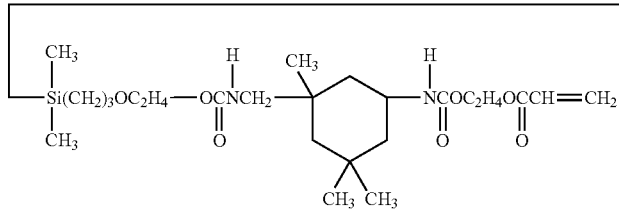

DMAA: dimethylacrylamide
N-VP: N-vinylpyrrolidone
MAA: methacrylic acid
EDMA: ethylene glycol dimethacrylate
VBMA: 4-vinylbenzyl methacrylate represented by the following formula:

[chemical formula 7]

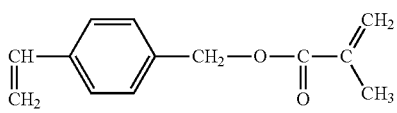

V-65: 2,2'-azobis(2,4-dimethyl valeronitrile)
<<Results>>

TABLE 2

|  | Production Example |  |  |  |  |  |
|---|---|---|---|---|---|---|
|  | 1 | 2 | 3 | 4 | 5 | 6 |
| Central portion (first hydrous soft material) | C1 | C1 | C2 | C2 | C1 | C1 |
| Peripheral portion (second hydrous soft material) | P3 | P4 | P3 | P1 | P1 | P2 |
| B/A | 1.05 | 1.00 | 0.97 | 0.98 | 1.07 | 1.10 |
| Hydration treatment 2% NaHCO$_3$ aq | A |  |  |  | A | A |
| 23% NaCl + 2% NaHCO$_3$ aq |  | A | A | A |  |  |
| Shape after hydration | flat | flat | flat | flat | wavy | Wavy | foot note: In each Example, the hydration treatment liquid used was one estimated as A shown in Table.

Examples 1 to 4 and Comparative Example 1

The material for central portion (first hydrous soft material) and the material for the peripheral portion (second hydrous soft material) selected from the compositions as shown in Table 3 below were combined, and hybrid soft contact lenses of Examples 1 to 4 and Comparative Example 1 were produced according to the production process of test sample described above. Combination of the material for the central portion (first hydrous soft material) and the material for the peripheral portion (second hydrous soft material) in each hybrid soft contact lens is shown in Table 4. It should be noted that in this examination, the formed product in 5. of the above production process of the test sample was shaped into not a plate shape but a lens shape by cutting.

<<Autoclave Resistance (Steam Sterilization under Pressure) Test>>

Samples:
1) Lenses made of a single material prepared with the blend composition shown in Table 3 below; and
2) Hybrid soft contact lenses of the above Examples 1 to 4 and Comparative Example 1

Autoclave Treatment Condition:
A piece of the lens was placed into a glass vial charged with physiological saline (about 3 mL) was subjected to an autoclave treatment (121° C. for 20 min) using a high pressure steam sterilizer (manufactured by Hirayama Manufacturing Corporation, model SM-18).

Evaluation Method:
After gradually cooling to room temperature, the lens was removed to identify the appearance, and evaluated according to the following criteria. The results are shown in Table 3 and Table 4.

Criteria:
A: Being transparent and no deformation caused, or being transparent and deformation caused to the extent acceptable for a contact lens; and
B: Being opaque, or deformation caused to the extent not acceptable for a contact lens.

TABLE 3

|  | Hydrous soft material |  |  |  |  |  |  | Non-hydrous soft material |
|---|---|---|---|---|---|---|---|---|
|  | C1 | C2 | P1 | P2 | P3 | P4 | P5 | H1 |
| SiSt | 20 | 15 | — | 7 | 16 | — | — | 55 |
| SiMA | — | — | 38 | 38 | — | 60 | — | — |
| Siloxane macromonomer | — | 5 | 17 | — | 42 | 10 | — | — |
| 3FEMA | — | — | — | — | — | — | — | 35 |
| DMAA | — | — | 45 | 45 | 42 | 30 | — | — |
| N-VP | 16 | 18 | — | 10 | — | — | — | — |
| MAA | 4 | 2 | — | — | — | — | — | — |
| HEMA | — | — | — | — | — | — | 80 | 10 |
| HOB | — | — | — | — | — | — | 20 | — |

TABLE 3-continued

|  | Hydrous soft material | | | | | | Non-hydrous soft material |
|---|---|---|---|---|---|---|---|
|  | C1 | C2 | P1 | P2 | P3 | P4 | P5 | H1 |
| EDMA | — | — | 0.2 | 0.5 | 0.5 | 0.3 | 0.2 | 10 |
| VBMA | 0.2 | 0.2 | — | — | — | — | — | — |
| V-65 | 0.3 | 0.2 | 0.2 | 0.2 | 0.2 | 0.1 | 0.1 | 0.3 |
| Autoclaving resistance | A | A | A | A | A | A | A | B |

3FEMA: 2,2,2,-trifluoroethyl methacrylate
HEMA: 2-hydroxyethyl methacrylate
HOB: hydroxybutyl methacrylate Compound names or chemical structures of components other than these are as described above.

TABLE 4

|  | Example 1 | Example 2 | Example 3 | Example 4 | Comparative Example 1 |
|---|---|---|---|---|---|
| Central portion (first hydrous soft material) | C1 | C1 | C2 | C2 | H1 |
| Peripheral portion (second hydrous soft material) | P3 | P4 | P3 | P1 | P5 |
| Autoclaving resistance | A | A | A | A | B |

On the plates of the material for the central portion (first hydrous soft material) C2, and the material for the peripheral portion (second hydrous soft material) P1, changes of dimension of the materials in various hydration treatment liquids at various temperatures were determined. In addition, the hybrid soft contact lens (C2/P1) of Example 4 was subjected to the hydration treatment in each hydration treatment liquid at each temperature. The results are shown in Table 5 and Table 6.

With respect to the determination of the rate of size change resulting from the difference in the osmotic pressure of the hydration treatment liquid shown in Table 5, and the determination of the rate of size change resulting from the difference in the pH of the hydration treatment liquid show in Table 6, the following measurement conditions were employed.

Apparatus: manufactured by Nikon Corporation, Profile Projector V-12B; Osmometer, manufactured by Toa Electronics Ltd., HSM-1

Method: The diameter of a polymer plate having a diameter of 12 mm and a thickness of 0.2 mm in a dry state was measured after immersion in each immersion liquid (hydration treatment liquid).

TABLE 5

Measurement on each treatment (measurement in saturated state)

| Material | Hydration treatment liquid | Osmotic pressure (mOsm/kg) | Dry | 60° C. | 40° C. | 20° C. |
|---|---|---|---|---|---|---|
| C2 | DW | 0 | 12.00 | 12.98 | 13.00 | 13.00 |
|  | 10% NaCl | 3460 | 12.00 | 12.80 | 12.84 | 12.86 |
|  | 23% NaCl | 8620 | 12.00 | 12.35 | 12.40 | 12.46 |
|  | 2% sodium bicarbonate | 423 | 12.00 | 13.78 | 13.84 | 13.84 |
|  | 2% sodium bicarbonate-10% NaCl | 4000 | 12.00 | 13.40 | 13.42 | 13.50 |
|  | 2% sodium bicarbonate-23% NaCl | 9220 | 12.00 | 12.70 | 12.78 | 12.86 |
| P1 | DW | 0 | 12.00 | 14.00 | 14.06 | 14.30 |
|  | 10% NaCl | 3460 | 12.00 | 13.40 | 13.70 | 14.00 |
|  | 23% NaCl | 8620 | 12.00 | 12.78 | 13.02 | 13.48 |
|  | 2% sodium bicarbonate | 423 | 12.00 | 13.90 | 14.00 | 14.22 |
|  | 2% sodium bicarbonate-10% NaCl | 4000 | 12.00 | 13.46 | 13.64 | 13.90 |
|  | 2% sodium bicarbonate-23% NaCl | 9220 | 12.00 | 12.68 | 12.92 | 13.30 |

Rate of size change of each plate

| Material | Hydration treatment liquid | Osmotic pressure (mOsm/kg) | Rate of size change (60° C.) | Rate of size change (40° C.) | Rate of size change (20° C.) |
|---|---|---|---|---|---|
| C2 | DW | 0 | 1.082 | 1.083 | 1.083 |
|  | 10% NaCl | 3460 | 1.067 | 1.070 | 1.072 |
|  | 23% NaCl | 8620 | 1.029 | 1.033 | 1.038 |
|  | 2% sodium bicarbonate | 423 | 1.148 | 1.153 | 1.153 |
|  | 2% sodium bicarbonate-10% NaCl | 4000 | 1.117 | 1.118 | 1.125 |
|  | 2% sodium bicarbonate-23% NaCl | 9220 | 1.058 | 1.065 | 1.072 |
| P1 | DW | 0 | 1.167 | 1.172 | 1.192 |
|  | 10% NaCl | 3460 | 1.117 | 1.142 | 1.167 |
|  | 23% NaCl | 8620 | 1.065 | 1.085 | 1.123 |
|  | 2% sodium bicarbonate | 423 | 1.158 | 1.167 | 1.185 |
|  | 2% sodium bicarbonate-10% NaCl | 4000 | 1.122 | 1.137 | 1.158 |
|  | 2% sodium bicarbonate-23% NaCl | 9220 | 1.057 | 1.077 | 1.108 |

Ratio of rate of change of each plate

| Material | Hydration treatment liquid | Osmotic pressure (mOsm/kg) | Ratio (B/A) 60° C. | Ratio (B/A) 40° C. | Ratio (B/A) 20° C. |
|---|---|---|---|---|---|
| C2/P1 | DW | 0 | 0.927 | 0.925 | 0.909 |
|  | 10% NaCl | 3460 | 0.955 | 0.937 | 0.919 |
|  | 23% NaCl | 8620 | 0.966 | 0.952 | 0.924 |
|  | 2% sodium bicarbonate | 423 | 0.991 | 0.989 | 0.973 |
|  | 2% sodium bicarbonate-10% NaCl | 4000 | 0.996 | 0.984 | 0.971 |
|  | 2% sodium bicarbonate-23% NaCl | 9220 | 1.002 | 0.989 | 0.967 |

Difference in rate of change of each plate

| Material | Hydration treatment liquid | Osmotic pressure (mOsm/kg) | Difference \|B − A\| 60° C. | Difference \|B − A\| 40° C. | Difference \|B − A\| 20° C. |
|---|---|---|---|---|---|
| C2/P1 | DW | 0 | 0.085 | 0.089 | 0.109 |
|  | 10% NaCl | 3460 | 0.050 | 0.072 | 0.095 |
|  | 23% NaCl | 8620 | 0.036 | 0.052 | 0.085 |
|  | 2% sodium bicarbonate | 423 | 0.010 | 0.014 | 0.032 |
|  | 2% sodium bicarbonate-10% NaCl | 4000 | 0.005 | 0.019 | 0.033 |

TABLE 5-continued

| | | | | |
|---|---|---|---|---|
| 2% sodium bicarbonate-23% NaCl | 9220 | 0.001 | 0.012 | 0.036 |

TABLE 6

Measurement on each treatment
(Measurements in saturated state)

| Material | Hydration liquid | Osmotic pressure (mOsm/kg) | pH | Dry | 40° C. | 20° C. |
|---|---|---|---|---|---|---|
| C2 | 5.5% D (+)-glucose | 330 | 8.75 | 12.00 | — | 13.75 |
| | PBS (−) | 289 | 7.17 | 12.00 | — | 13.70 |
| | 1.8% ethylene glycol | 298 | 5.54 | 12.00 | — | 13.83 |
| | 1.8% urea | 299 | 5.46 | 12.00 | — | 13.70 |
| | 2.7% glycerol | 302 | 4.97 | 12.00 | — | 13.70 |
| | 1.15% KC I | 287 | 4.53 | 12.00 | — | 13.70 |
| | ISO physiological saline | 312 | 7.43 | 12.00 | — | 13.70 |
| | 5.0% citric acid | 264 | 1.66 | 12.00 | 13.15 | 13.30 |
| | 5.0% ascorbic acid | 298 | 2.21 | 12.00 | 13.22 | 13.70 |
| P1 | 5.5% D (+)-glucose | 330 | 8.75 | 12.00 | — | 14.30 |
| | PBS (−) | 289 | 7.17 | 12.00 | — | 14.30 |
| | 1.8% ethylene glycol | 298 | 5.54 | 12.00 | — | 14.40 |
| | 1.8% urea | 299 | 5.46 | 12.00 | — | 14.35 |
| | 2.7% glycerol | 302 | 4.97 | 12.00 | — | 14.35 |
| | 1.15% KC I | 287 | 4.53 | 12.00 | — | 14.30 |
| | ISO physiological saline | 312 | 7.43 | 12.00 | — | 14.30 |
| | 5.0% citric acid | 264 | 1.66 | 12.00 | 13.80 | 14.30 |
| | 5.0% ascorbic acid | 298 | 2.21 | 12.00 | 13.90 | 14.30 |

Rate of size change of each plate

| Material | Hydration liquid | Osmotic pressure (mOsm/kg) | pH | Rate of size change (40° C.) | Rate of size change (20° C.) |
|---|---|---|---|---|---|
| C2 | 5.5% D (+)-glucose | 330 | 8.75 | — | 1.146 |
| | PBS (−) | 289 | 7.17 | — | 1.142 |
| | 1.8% ethylene glycol | 298 | 5.54 | — | 1.153 |
| | 1.8% urea | 299 | 5.46 | — | 1.142 |
| | 2.7% glycerol | 302 | 4.97 | — | 1.142 |
| | 1.15% KC I | 287 | 4.53 | — | 1.142 |
| | ISO physiological saline | 312 | 7.43 | — | 1.142 |
| | 5.0% citric acid | 264 | 1.66 | 1.096 | 1.108 |
| | 5.0% ascorbic acid | 298 | 2.21 | — | 1.142 |
| P1 | 5.5% D (+)-glucose | 330 | 8.75 | — | 1.192 |
| | PBS (−) | 289 | 7.17 | — | 1.192 |
| | 1.8% ethylene glycol | 298 | 5.54 | — | 1.200 |
| | 1.8% urea | 299 | 5.46 | — | 1.196 |
| | 2.7% glycerol | 302 | 4.97 | — | 1.196 |
| | 1.15% KC I | 287 | 4.53 | — | 1.192 |
| | ISO physiological saline | 312 | 7.43 | — | 1.192 |
| | 5.0% citric acid | 264 | 1.66 | 1.150 | 1.192 |
| | 5.0% ascorbic acid | 298 | 2.21 | — | 1.192 |

Ratio of rate of size change of each plate

| Material | Hydration liquid | Osmotic pressure (mOsm/kg) | pH | Ratio (B/A) 40° C. | Ratio (B/A) 20° C. |
|---|---|---|---|---|---|
| C2/P1 | 5.5% D (+)-glucose | 330 | 8.75 | — | 0.962 |
| | PBS (−) | 289 | 7.17 | — | 0.958 |
| | 1.8% ethylene glycol | 298 | 5.54 | — | 0.960 |
| | 1.8% urea | 299 | 5.46 | — | 0.955 |
| | 2.7% glycerol | 302 | 4.97 | — | 0.955 |
| | 1.15% KC I | 287 | 4.53 | — | 0.958 |
| | ISO physiological saline | 312 | 7.43 | — | 0.958 |
| | 5.0% citric acid | 264 | 1.66 | 0.953 | 0.930 |
| | 5.0% ascorbic acid | 298 | 2.21 | — | 0.958 |

Difference in rate of size change of each plate

| Material | Hydration liquid | Osmotic pressure (mOsm/kg) | pH | Difference \|B − A\| 40° C. | Difference \|B − A\| 20° C. |
|---|---|---|---|---|---|
| C2/P1 | 5.5% D (+)-glucose | 330 | 8.75 | — | 0.05 |
| | PBS (−) | 289 | 7.17 | — | 0.05 |
| | 1.8% ethylene glycol | 298 | 5.54 | — | 0.05 |
| | 1.8% urea | 299 | 5.46 | — | 0.05 |
| | 2.7% glycerol | 302 | 4.97 | — | 0.05 |
| | 1.15% KC I | 287 | 4.53 | — | 0.05 |
| | ISO physiological saline | 312 | 7.43 | — | 0.05 |
| | 5.0% citric acid | 264 | 1.66 | 0.05 | 0.08 |
| | 5.0% ascorbic acid | 298 | 2.21 | — | 0.05 |

It was revealed that when the difference |B−A| and the ratio (B/A) of the rate of size change satisfy the requirements represented by the above formula (the difference being no greater than 0.05; the ratio being no less than 0.94 and no greater than 1.06), jellyfish-like deformation was not caused in the hybrid soft lens obtained in Example 4.

More specifically, in connection with the osmotic pressure of the hydration treatment liquid (Table 5), when the hybrid soft contact lens of Example 4 was subjected to the hydration treatments: with a 10% aqueous NaCl solution at 60° C.; with a 23% aqueous NaCl solution at 60° C.; with a 2% aqueous sodium bicarbonate solution at 60° C., 40° C. and 20° C.; with a 2% aqueous sodium bicarbonate-10% NaCl mix solution at 60° C., 40° C. and 20° C.; and with a 2% aqueous sodium bicarbonate 23%-NaCl mix solution at 60° C., 40° C. and 20°, shape distortion was not caused, whereas, when the hydration treatment liquid was carried out with a 23% aqueous NaCl solution at 40° C., some shape distortion was caused, and in other cases, the shape distortion was caused.

Moreover, in connection with the osmotic pressure and the pH of the hydration treatment liquid (Table 6), when the hybrid soft contact lens of Example 4 was subjected to the hydration treatments: with a 5.5% aqueous D(+)-glucose solution at 20° C.; with a PBS(−) aqueous solution at 20° C.; with a 1.8% aqueous ethylene glycol solution at 20° C.; with a 1.8% aqueous urea solution at 20° C.; with a 2.7% aqueous glycerol solution at 20° C.; with a 1.15% aqueous KCl solution at 20° C.; with an ISO physiological saline at 20° C.; with a 5.0% aqueous citric acid solution at 40° C.; and with a 5.0% aqueous ascorbic acid solution at 20° C., the shape distortion was not caused, whereas, when the hydration treatment liquid was carried out with a 5.0% aqueous citric acid solution at 20° C., the shape distortion was caused.

It is to be noted that the results of measurement of the Young's modulus (tensile modulus of elasticity) on the materials for the central portion (first hydrous soft materials) C1 to C2 and the materials for the peripheral portion (second hydrous soft materials) P1 to P4 are as shown in Table 7. Also, the measurement conditions are as in the following.

Apparatus: manufactured by Shimadzu Rika Corporation, universal tester AUTOGRAPH, model AG-IS MS: manufactured by AS ONE Corporation, Low Constant Temperature Water Bath CB-302
Loaded cells: 100 N
Tension rate: 20 mm/min (C1: 1 mm/min)
Temperature: 20° C.
Jig: thickness 0.3 mm
Sample shape: dumbbell (width: about 2 mm; distance between jigs: about 4 mm)
Process: measured in physiological saline at 20° C.

TABLE 7

| Lot No. | Tensile modulus of elasticity (MPa) | Standard deviation (n = 10) |
| --- | --- | --- |
| C1 | 63 | 4.7 |
| C2 | 30 | 10.0 |
| P3 | 2.6 | 0.37 |
| P4 | 0.34 | 0.05 |
| P1 | 0.25 | 0.09 |
| P2 | 0.24 | 0.06 |

(Otsuka physiological saline injection Lot No. 8J78N)

Examples 5 to 12

Next, hybrid soft contact lenses were produced by the following procedure according to the Production Method (2).

1. The first curable composition was prepared in accordance with the blend composition shown in Table 8. The first curable composition was injected into a glass test tube, and polymerization was allowed by heating at 30° C. for 24 hours, and then at 50° C. for 24 hours to obtain a polymer having a rod shape (first hydrous soft material for the central portion of the lens) (step of forming the first hydrous soft material).

2. The second curable composition was prepared in accordance with the blend composition shown in Table 8. The second curable composition was injected into a glass test tube, and polymerization was allowed by heating at 30° C. for 24 hours, and then at 50° C. for 24 hours to obtain a polymer having a rod shape (second hydrous soft material for peripheral portion of the lens) (step of forming the second hydrous soft material).

3. Each polymer having a rod shape obtained in the above sections 1 and 2 was cut to give a thickness of 4 mm to obtain the first hydrous soft material for the central portion of the lens, and the second hydrous soft material for the peripheral portion of the lens having a plate shape.

4. The third curable composition was prepared in accordance with the blend composition shown in Table 9. This third curable composition was applied on each one face of the aforementioned first hydrous soft material for the central portion of the lens and the second hydrous soft material for the peripheral portion of the lens having a plate shape.

5. After standing for 2 min in order to permit impregnation of the third curable composition following the application, the applied faces were brought into contact with each other to lap both materials, and left to stand still for 3 min.

6. An integrated block produced in the above section 5 was irradiated with UV using a UV Curing System manufactured by Eye Graphics Co., Ltd. for 20 min, whereby a formed product having the first hydrous material and the second hydrous soft material integrated via a joining layer was obtained.

7. The formed product obtained in the above section 6 was processed into a lens shape by cutting to obtain a hybrid soft contact lens (shaping step). This hybrid soft contact lens in a dry state was immersed in a 2% aqueous $NaHCO_3$ solution and allowed to stand still at 60° C.

TABLE 8

| | Central portion (first curable composition) | Peripheral portion (second curable composition) | |
| --- | --- | --- | --- |
| | C3 | P6 | P7 |
| SiSt | 15 | — | — |
| SiMA | — | — | 47 |
| Siloxane macromonomer | 5 | — | 10 |
| DMAA | — | — | 43 |
| N-VP | 18 | — | — |
| MAA | 2 | — | — |
| HEMA | 2 | 80 | — |
| HOB | — | 20 | — |
| EDMA | — | 0.2 | 0.3 |
| VBMA | 0.2 | — | — |
| V-65 | 0.2 | 0.1 | 0.1 |
| Rate of size change | 1.15 | 1.13 | 1.15 |
| Moisture content (%) | 39 | 30 | 35 |

TABLE 9

| | Third material (third curable composition) | | | | | | |
| --- | --- | --- | --- | --- | --- | --- | --- |
| | I1 | I2 | I3 | I4 | I5 | I6 | I7 |
| HEMA | 80 | — | — | — | — | — | — |
| HOB | 20 | — | — | — | 60 | — | — |
| GMA | — | 100 | — | 90 | 40 | — | — |
| GDMA | — | — | 100 | 10 | — | — | — |
| PEG400 diacrylate | — | — | — | — | — | 100 | — |
| MMA | — | — | — | — | — | — | 100 |
| EDMA | 0.2 | 0.2 | — | — | 0.2 | — | 0.2 |
| HMPPO | 0.2 | 0.2 | 0.2 | 0.2 | 0.2 | 0.2 | 0.2 |

GMA: glycerol methacrylate
GDMA: glycerol dimethacrylate
PEG: polyethylene glycol
MMA: methyl methacrylate
HMPPO: 2-hydroxy-2-methyl-1-phenylpropan-1-one Compound names or chemical structures of components other than these are as described above.

Hybrid soft contact lenses of Examples 5 to 12 were obtained in accordance with the aforementioned procedure, and using the combination of the first to third curable compositions as shown in Table 10. The lens shape after being immersed in a 2% aqueous $NaHCO_3$ solution and allowed to stand still at 60° C. was evaluated according to the following evaluation method. The results are shown in Table 10. Any of the joining layer had a thickness of no greater than 0.02 mm.

Evaluation Method:

A: No deformation caused, or deformation caused to the extent acceptable for a contact lens.

B: Deformation caused to the extent not acceptable for a contact lens.

TABLE 10

|  | Example 5 | Example 6 | Example 7 | Example 8 | Example 9 | Example 10 | Example 11 | Example 12 |
|---|---|---|---|---|---|---|---|---|
| Central portion (first curable composition) | C3 | C3 | C3 | C3 | C3 | C3 | C3 | C3 |
| Peripheral portion (second curable composition) | P6 | P6 | P7 | P7 | P7 | P7 | P7 | P7 |
| Third curable composition | I1 | I2 | I2 | I3 | I4 | I5 | I6 | I7 |
| Shape distortion | A | A | A | A | A | A | A | A |

Example 13, 14 and Reference Examples 1 to 3

Next, hybrid soft contact lenses were produced by the following procedure according to the Production Method (3).

1. The third curable composition was prepared in accordance with the blend composition shown in the above Table 9. This third curable composition was irradiated with UV using a UV Curing System manufactured by Eye Graphics Co., Ltd. for 20 min, whereby a joining layer having a plate shape with each thickness shown in Table 11 was obtained.

2. The first curable composition was prepared in accordance with the blend composition shown in Table 8 above. The first curable composition was filled in a polypropylene (PP) cup, and sealed with the joining layer obtained in the above section 1. by covering the cup. Polymerization was allowed by heating the sealed cup at 40° C. for 1 hour, at 50° C. for 2 hours, at 60° C. for 2 hours, and at 90° C. for 30 min to obtain a block in which the first hydrous soft material and the joining layer were integrated (step of forming the first hydrous soft material).

3. The second curable composition was prepared in accordance with the blend composition shown in Table 8 above. The second curable composition was filled in a fresh polypropylene (PP) cup, and sealed by covering the cup with the block such that the joining layer obtained in the above section 2 was brought into contact with the second curable composition. Polymerization was allowed by heating the sealed cup at 40° C. for 1 hour, at 50° C. for 2 hours, at 60° C. for 2 hours, and at 90° C. for 30 min to obtain a formed product in which the first hydrous soft material, the joining layer and the second hydrous soft material were integrated (step of forming the second hydrous soft material).

4. The formed product obtained in the above section 3 was processed into a lens shape by cutting to obtain a hybrid soft contact lens (shaping step). This hybrid soft contact lens was immersed in a 2% aqueous NaHCO$_3$ solution and allowed to stand still at 60° C.

Hybrid soft contact lenses of Examples 13 and 14, and Reference Examples 1 to 3 were obtained in accordance with the aforementioned procedure, and using the combination of the first to third curable compositions as shown in Table 11. The lens shape after being immersed in a 2% aqueous NaHCO$_3$ solution and allowed to stand still at 60° C. was evaluated, and the results are shown in Table 11. The evaluation method was similar to that described above with the criteria shown in Table 10.

TABLE 11

|  | Example 13 | Example 14 | Reference Example 1 | Reference Example 2 | Reference Example 3 |
|---|---|---|---|---|---|
| Central portion (first curable composition) | C3 | C3 | C3 | C3 | C3 |
| Peripheral portion (second curable composition) | P6 | P6 | P7 | P6 | P6 |
| Third curable composition | I5 | I5 | I5 | I5 | I5 |
| Thickness (mm) | 0.5 | 0.1 | 1.5 | 1.5 | 1.0 |
| Shape distortion | A | A | B | B | B |

Accordingly, by any method among the Production Methods (1) to (3), it was possible to produce a hybrid soft contact lens without occurrence of deformation during the hydration treatment. In addition, any of the hybrid soft contact lenses produced in this manner had a smooth central portion, and a smooth boundary portion between the central portion and the peripheral portion as ascertained by touching with a finger, revealing that uncomfortable feeling in wearing is reduced.

[Industrial Applicability]

As in the foregoing, the hybrid soft contact lens of the present invention is superior in wearing feel, and can be used as a soft contact lens including two types of soft materials, while enabling steam sterilization at high temperatures.

[Explanation of the Reference Symbols]

1: polypropylene cup
2: first curable composition
2': first hydrous soft material
3: polyethylene terephthalate film
4: polypropylene cup
5: second curable composition
5': second hydrous soft material
6: plate

The invention claimed is:

1. A hybrid soft contact lens comprising a central portion formed with a first hydrous soft material, and a peripheral portion formed with a second hydrous soft material,
   the first hydrous soft material having a Young's modulus of no less than 3.0 MPa and no greater than 100 MPa,
   the second hydrous soft material having a Young's modulus of no less than 0.20 MPa and less than 3.0 MPa, and
   the first hydrous soft material being obtained by curing a first curable composition.

2. The hybrid soft contact lens according to claim 1, wherein the first curable composition includes a silicone-containing monomer.

3. The hybrid soft contact lens according to claim 2, wherein the difference between the size change (A) of the first hydrous soft material and the size change (B) of the second hydrous soft material is no greater than 0.05 as determined according to the following formula (1):

> Size change=Diameter (mm) of a plate immersed in physiological saline at 20° C. after being subjected to a hydration treatment/Diameter (mm) of the plate prior to the hydration treatment  (1).

4. The hybrid soft contact lens according to claim 3, wherein a ratio (B/A) of the size change (B) of the second hydrous soft material with respect to the size change (A) of the first hydrous soft material is no less than 0.94 and no greater than 1.06.

5. The hybrid soft contact lens according to claim 2, wherein the first curable composition includes a silicone-containing monomer represented by the following formula (I):

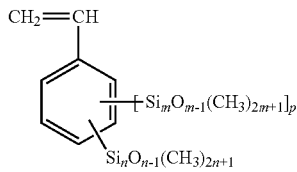

(I)

wherein in the formula (I), m and n are each independently an integer of 1 to 15, and p is 0 or 1, and
    the content of the silicone-containing monomer is no less than 30% by mass and no greater than 70% by mass.

6. A method for producing a hybrid soft contact lens comprising a central portion formed with a first hydrous soft material, and a peripheral portion formed with a second hydrous soft material, the first hydrous soft material being obtained by curing a first curable composition including a silicone-containing monomer,
    the method comprising:
        forming the first hydrous soft material for the central portion of the lens by curing the first curable composition;
        forming a second hydrous soft material for the peripheral portion of the lens by curing the second curable composition; and
        shaping a formed product including the first hydrous soft material and the second hydrous soft material into a contact lens shape,
    wherein the first hydrous soft material has a Young's modulus of no less than 3.0 MPa and no greater than 100 MPa, and
    the second hydrous soft material has a Young's modulus of no less than 0.20 MPa and less than 3.0 MPa.

7. The method for producing a hybrid soft contact lens according to claim 6, wherein one step of the step of forming the first hydrous soft material and the step of forming the second hydrous soft material is carried out before the other step of the step of forming the first hydrous soft material and the step of forming the second hydrous soft material, and the other step is carried out while the curable composition used in the other step is in contact with the one hydrous soft material formed in the one step.

8. The method for producing a hybrid soft contact lens according to claim 6, wherein the method comprises after the step of forming the first hydrous soft material and the step of forming the second hydrous soft material, integrating the formed first hydrous soft material and second hydrous soft material by allowing both hydrous soft materials to adhere via a third curable composition.

9. The method for producing a hybrid soft contact lens according to claim 6, wherein the method comprises before the step of forming the first hydrous soft material and the step of forming the second hydrous soft material, forming a joining layer having an average thickness of no greater than 0.5 mm by curing a third curable composition,
    the step of forming the first hydrous soft material is carried out while making the first curable composition in contact with one face of the joining layer, and
    the step of forming the second hydrous soft material is carried out while making the second curable composition in contact with another face of the joining layer.

10. The method for producing a hybrid soft contact lens according to claim 6, wherein the difference between the size change (A) of the first hydrous soft material and the size change (B) of the second hydrous soft material determined according to the following formula (1) is no greater than 0.05:

> Size change=Diameter (mm) of a plate immersed in physiological saline at 20° C. after being subjected to a hydration treatment/ Diameter (mm) of the plate prior to the hydration treatment  (1).

11. The method for producing a hybrid soft contact lens according to claim 6, wherein the ratio (B/A) of the size change (B) of the second hydrous soft material with respect to the size change (A) of the first hydrous soft material is no less than 0.94 and no greater than 1.06.

12. The method for producing a hybrid soft contact lens according to claim 6, wherein the method further comprises carrying out a hydration treatment of the formed product shaped into a contact lens shape by immersing in a hydration treatment liquid, and
    a combination of the first hydrous soft material, the second hydrous soft material and the hydration treatment liquid is used capable of giving the difference between the size change (A') of the first hydrous soft material and the size change (B') of the second hydrous soft material determined according to the following formula (1') being no greater than 0.05:

> Size change=Diameter (mm) of a plate immersed in the hydration treatment liquid after being subjected to the hydration treatment with the hydration treatment liquid/Diameter (mm) of the plate prior to the hydration treatment  (1').

13. The method for producing a hybrid soft contact lens according to claim 12, wherein a combination of the first hydrous soft material, the second hydrous soft material and the hydration treatment liquid is used capable of giving the ratio (B'/A') of the size change (B') of the second hydrous soft material with respect to the size change (A') of the first hydrous soft material being no less than 0.94 and no greater than 1.06.

14. A hydration treatment method of a hybrid soft contact lens comprising a central portion formed with a first hydrous soft material, and a peripheral portion formed with a second hydrous soft material, the first hydrous soft material being obtained by curing a first curable composition including a silicone-containing monomer,
    the method comprising immersing the hybrid soft contact lens in a hydration treatment liquid, and
    the hydration treatment liquid employed being capable of giving the difference between the size change (A') of the first hydrous soft material and the size change (B') of the second hydrous soft material determined according to the following formula (1') being no greater than 0.05:

Size change=Diameter (mm) of a plate immersed in the hydration treatment liquid after being subjected to the hydration treatment with the hydration treatment liquid/Diameter (mm) of the plate prior to the hydration treatment    (1'), wherein the first hydrous soft material has a Young's modulus of no less than 3.0 MPa and no greater than 100 MPa, and the second hydrous soft material has a Young's modulus of no less than 0.20 MPa and less than 3.0 MPa.

15. The hydration treatment method of a hybrid soft contact lens according to claim 14, wherein the hydration treatment liquid is capable of giving the ratio (B'/A') of the size change (B') of the second hydrous soft material with respect to the size change (A') of the first hydrous soft material being no less than 0.94 and no greater than 1.06.

* * * * *